US010572953B1

(12) United States Patent
Char et al.

(10) Patent No.: US 10,572,953 B1
(45) Date of Patent: Feb. 25, 2020

(54) COMPUTER-IMPLEMENTED SYSTEMS AND METHODS FOR PREPARING A TAX RETURN IN WHICH TAX DATA IS REQUESTED AND ENTERED AD HOC

(71) Applicant: INTUIT INC., Mountain View, CA (US)

(72) Inventors: Ronald Jason Char, San Diego, CA (US); Sasha Mikhael Perez, Del Mar, CA (US); John Brian Moss, Carlsbad, CA (US); Gang Wang, San Diego, CA (US); Arien C. Ferrell, Sunnyvale, CA (US); Michael J. Graves, Sunnyvale, CA (US)

(73) Assignee: INTUIT INC., Mountain View, CA (US)

( * ) Notice: Subject to any disclaimer, the term of this patent is extended or adjusted under 35 U.S.C. 154(b) by 241 days.

(21) Appl. No.: 15/220,281

(22) Filed: Jul. 26, 2016

(51) Int. Cl.
*G06Q 40/00* (2012.01)

(52) U.S. Cl.
CPC .................. *G06Q 40/123* (2013.12)

(58) Field of Classification Search
None
See application file for complete search history.

(56) References Cited

U.S. PATENT DOCUMENTS

| 8,346,635 B1 * | 1/2013 | Olim ...................... G06Q 40/12 |
| | | 705/30 |
| 2016/0078567 A1 * | 3/2016 | Goldman ............. G06Q 40/123 |
| | | 705/31 |
| 2016/0321050 A1 * | 11/2016 | Compton ........... G06Q 30/0209 |
| 2017/0228828 A1 * | 8/2017 | Hochberg ............ G06Q 40/123 |

\* cited by examiner

*Primary Examiner* — Joseph W. King
(74) *Attorney, Agent, or Firm* — DLA Piper LLP US

(57) ABSTRACT

Systems, methods and articles of manufacture for preparing a tax return in which tax questions may be generated and presented to a user in an ad hoc manner. A tax system includes a computing device executing a tax program. The tax program can display a plurality of user interface presentations, such as interview or question screens, with tax questions asking the user to provide tax data related to a taxpayer for preparing a tax return for the taxpayer. The tax program allows the user to skip a tax question on a user interface presentation, and proceed with subsequent user interface presentations. When the tax program determines that a response to the skipped tax questions is required, the tax program dynamically generates a skipped tax question user interface presentation with the skipped tax question and presents it to the user.

12 Claims, 18 Drawing Sheets

FIG. 3 — Transform →

| | $Q_A$ | $Q_B$ | $Q_C$ | $Q_D$ | $Q_E$ | $Q_F$ | $Q_G$ | Goal |
|---|---|---|---|---|---|---|---|---|
| Rule₁ | Y | ? | N | ? | ? | ? | ? | Yes |
| Rule₂ | Y | ? | Y | ? | ? | ? | Y | Yes |
| Rule₃ | N | Y | ? | ? | Y | ? | Y | Yes |
| Rule₄ | N | Y | ? | ? | N | N | ? | Yes |
| Rule₅ | N | N | ? | N | ? | N | ? | Yes |

FIG. 4

| | $Q_A$ | $Q_B$ | $Q_C$ | $Q_D$ | $Q_E$ | $Q_F$ | $Q_G$ | STAT1 | STAT2 |
|---|---|---|---|---|---|---|---|---|---|
| Rule$_1$ | Y | ? | ? | ? | N | ? | ? | 40% | 10% |
| Rule$_2$ | N | Y | Y | ? | ? | ? | N | 20% | 5% |
| Rule$_3$ | N | Y | N | Y | ? | N | ? | 14% | 6% |
| Rule$_4$ | Y | ? | ? | ? | N | Y | N | 65% | 20% |
| Rule$_5$ | N | Y | N | ? | ? | ? | Y | 18% | 40% |
| Rule$_6$ | Y | Y | N | ? | ? | N | ? | 5% | 25% |

FIG. 5

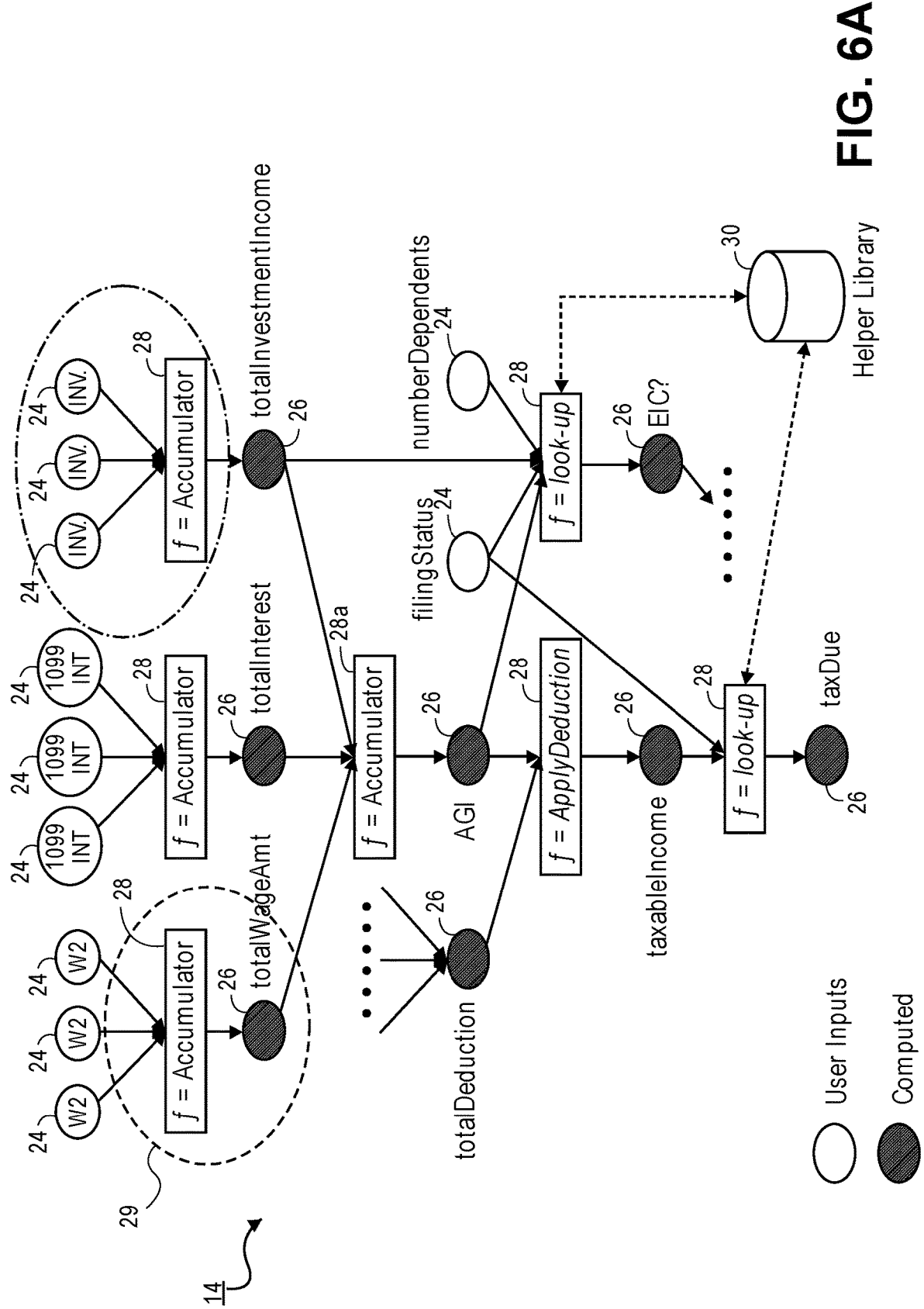

FIG. 13A

119 — ACA Topic
118 — ZIP Code: 92129
AGI: 50,000
Tax Exempt Interest: 500
Exemption? NO
Coverage? NO PLAN 116 — ⊖ Shared Responsibility Penalty is $405 because Deficit in Coverage caused ACA Penalty to apply and then was no exemption.

116a — ⊕ Calculated ACA Penalty ($405) is $310 above minimum penalty and $394 below maximum penalty

119 — ACA Topic
118 — ZIP Code: 92129
AGI: 50,000
Tax Exempt Interest: 500
Exemption? NO
Coverage? NO PLAN 116 — ⊖ Shared Responsibility Penalty is $405 because Deficit in Coverage caused ACA Penalty to apply and then was no exemption.

116a — ⊖ Calculated ACA Penalty ($405) is $310 above minimum penalty and $394 below maximum penalty 116b — ⊕ Calculated ACA Penalty ($405) is 1% of taxable income ($40,500.00)

104

ACA Topic — 119
- ZIP Code: 92129
- AGI: 50,000
- Tax Exempt Interest: 500
- Exemption? NO
- Coverage? NO PLAN

118

⊖ Shared Responsibility Penalty is $405 because <u>Deficit in Coverage</u> caused <u>ACA Penalty</u> to apply and then was no <u>exemption</u>.  — 116

⊕ No exemption because you do not qualify for any of specified exemptions including affordability exemption because the <u>lowest cost plan</u> is less than 8% of household income.  — 116d

ACA Topic — 119
- ZIP Code: 92129
- AGI: 50,000
- Tax Exempt Interest: 500
- Exemption? NO
- Coverage? NO PLAN

118

⊖ Shared Responsibility Penalty is $405 because <u>Deficit in Coverage</u> caused <u>ACA Penalty</u> to apply and then was no <u>exemption</u>.  — 116

⊖ No Exemption
  • Lowest cost bronze plan through state Marketplace is $250/mo.  — 116e

COMPUTER-IMPLEMENTED SYSTEMS AND METHODS FOR PREPARING A TAX RETURN IN WHICH TAX DATA IS REQUESTED AND ENTERED AD HOC

SUMMARY

Embodiments of the present invention are directed to computerized preparation of an income tax return; and more particularly, to computerized systems, methods and articles of manufacture for preparing an income tax return in which request for tax data and entry of tax data are performed in an ad hoc manner, as opposed to a rigidly ordered sequence.

Tax return preparation is a time-consuming and laborious process. It is estimated that individuals and businesses spend around 6.1 billion hours per year complying with the filing requirements of the United States federal Internal Revenue Code. Tax return preparation software has been commercially available to assist taxpayers in preparing their tax returns. Tax return preparation software is typically run on a computing device such as a computer, laptop, tablet, or mobile computing device such as a Smartphone. Traditionally, a user has walked through a set of rigidly defined user interface interview screens that selectively ask questions requesting tax data relevant to a particular tax topic or data field needed to calculate a taxpayer's tax liability. In addition, the user must enter tax data in response to the questions or the system is unable to proceed with the sequence of interview questions.

In contrast to the rigidly defined user interface screens used in prior tax return preparation software, the present invention provides systems, methods, and articles which allow user interface presentations (e.g., tax question screens, interview screens, or other tax data input screens) requesting tax data from the user to be generated ad hoc. The user interface presentations are then presented to the user and the user enters tax data in response to the user interface presentations. In other words, user interface presentations may be generated and presented to the user to ask tax questions outside of a default place within a pre-determined sequence in which the interview screens are normally presented. Accordingly, if the user does not have tax data required to respond to a tax question in a user interface presentation at the time the screen is presented to the user, the present invention is configured to skip the tax question such that there is missing tax data, and advance to a next screen without receiving a response to the skipped tax question, and then dynamically generate a skipped question user interface presentation with the skipped tax question and present the skipped question user interface presentation to the user to obtain the missing tax data.

Accordingly, one embodiment of the present invention is directed to a computerized tax return preparation system (also referred to as a "tax system") for preparing a tax return for a taxpayer in which tax questions may be presented to a user in an ad hoc manner. The tax system may operate on a new construct in which tax rules and the calculations based thereon are established in declarative data-structures, namely, a completeness module and a tax calculation graph. Use of these data-structures permits the user interface to be loosely connected or even divorced from the tax calculation engine and the data used in the tax calculations.

More specifically, the tax system includes a computing device having a computer processor and memory. For instance, the computing device may be any suitable computing device, such as a computer, personal computer, computer server, website server, Smartphone, or combination of the foregoing. The tax system further includes a data store in communication with the computing device. The data store is configured to store tax data for a taxpayer for which a tax return is being prepared on the system (also referred to as tax data, taxpayer-specific tax data, and taxpayer data), including tax return data fields, tax related data and tax data calculated by the tax return preparation system. For example, the system may access tax data from any suitable source, such as data input by a user, or data electronically accessed from a database having applicable entity-specific compliance data. The tax data may be input by a user in response to a series of interview screens that selectively ask questions and/or request compliance data needed to complete a compliance form. As some examples, the tax data may include personal information, income, deductions and payment information. Personal information includes, for example, the taxpayer's name(s), address(es) social security number(s) or taxpayer identification number(s), birth date(s), and the like. Income includes the various sources of income such as income reported on forms W-2, K-1, 1099-B (sales of securities, like stocks or mutual funds), 1099-D (dividends), 1099-Income (independent contractor income), 1099-Int (interest income), 1099-Misc (miscellaneous income), etc. Deductions in the electronic tax return may be standard deductions or they may be itemized, based on the status of the taxpayer. Deductions may include, for example, interest paid on qualified loans such as home mortgages, charitable contributions, medical expenses, qualified losses, property taxes, other taxes paid, child expenses, and investment expenses and losses.

The tax system also includes a tax return preparation software application (also referred to as the "tax program") executable by the computing device. The tax program includes a tax calculation engine, tax logic agent and user interface manager are configured to utilize the declarative data structures embodied in the completeness module and calculation graph.

The tax calculation engine is configured to read tax data from the shared data store, perform a plurality of tax calculations and logic operations based on the tax calculation graph, and write calculated tax data to the shared data store. The tax calculation graph semantically describes data dependent operations comprising a plurality of interconnected nodes including one or more of input nodes, function nodes, and/or functional nodes, configured to be processed by a calculation engine to perform a plurality of tax calculations and operations.

The completeness module, also referred to herein as a "completion module," comprises a data structure that captures all the conditions necessary to obtain all of the compliance data necessary to complete the respective compliance form for submission to a responsible agency. The completeness module may be embodied in various forms. The completeness module may be embodied in completeness graph(s) (also referred to as "completion graphs") such as a decision tree, and/or the completeness module(s) may be in the form of decision tables, wherein the graphs and/or tables represent tax questions for obtaining tax data for each tax topic and the logic relating the tax questions to other tax questions and/or completion of the tax topic (e.g., the decision tables may be generated from completeness graph(s), as described herein). For instance, answers and/or entry of tax data in response to certain tax questions are logically related to other tax questions in the decision table and/or a completion goal for a tax topic indicating that the tax topic is completed. Similar to the calculation graph, a single completeness graph can comprehensively cover an tax return, or the completeness graph can be a plurality of completeness graphs each covering particular tax topics and/or sub-topics which may combined to form the overall completeness graph.

The tax logic agent is configured to review current run-time data including the tax data currently obtained and stored in the shared data store, evaluate missing tax data required to complete a tax topic or a tax return utilizing the completeness module, and output one or more suggested tax questions for obtaining the missing tax data to the user interface manager The user interface manager is configured to receive the one or more suggested tax questions from the tax logic agent, and analyze the suggested tax question(s). The user interface manager utilizes the suggested tax question(s) to determine a tax question(s) to present to a user of the tax system. The user interface manager may select one of the suggested tax question(s), or it may ignore the suggestions and present a different questions or prompt to the user. The user interface manager then presents the determined tax question(s) to the user. For example, the user interface manager may be configured to generate and display a user interface presentation (e.g., a tax question screen, interview screen, or other tax data input screen) to the user. The user interface presentation includes one or more tax questions for the user requesting tax data for the taxpayer and is also be configured to receive tax data in response to the tax questions from the user in the form of data input from the user.

The tax system is configured to repeat the process of the tax logic agent evaluating missing tax data, proposing suggested tax questions to the user interface manager, and the user interface manager presenting tax questions to the user and receiving tax data in response to the tax questions, until all tax topics have been covered and/or all tax data required to complete the tax return has been obtained. In this event, the tax logic agent, instead of outputting one or more suggestions for missing tax data may output a "done" instruction to the user interface manager. The computing device may then prepare a tax return based on the data in the shared data store. The tax return may be a conventional paper-based return or, alternatively, the tax return may be an electronic tax return which can then be e-filed. For instance, the tax program may include a services module configured to utilize the tax data to prepare and/or submit the tax return, such as generating an electronic tax return, printing a paper copy of a tax return, and/or electronically transmit a data file representing a completed tax return to the tax agency, such as the U.S. Internal Revenue Service ("IRS"), or the appropriate state or local tax agency.

As expressed above, the tax system is further configured to allow user interface presentations requesting tax data from the user to be generated and presented to the user in an ad hoc manner. This allows a user to skip a tax question and have the tax system proceed to a succeeding interview screen having different tax questions, while the tax system records the skipped tax question and dynamically generates an interview screen to ask the skipped tax question at a later time in the process. Thus, the tax system is configured to present a first user interface presentation to the user (e.g., an interview screen) which includes a first tax question requesting tax data for preparing the tax return. For any reason, user decides to skip the first tax question and instructs the tax system to proceed to the next user interface presentation. The tax system receives a prompt from the user (e.g., a selection of a "next" button) to proceed from the first user interface presentation, while the user has not provided a response to the first tax question. The tax system generates and stores a skipped tax question record indicating that the first tax question was skipped. For instance, the record may be added to the completeness module and/or the user interface manager.

The tax system then proceeds with obtaining tax data by presenting a second user interface presentation to a user including one or more other tax questions different from the first tax question. After presenting the second user interface presentation (or any number of subsequent user interface presentations), the tax system determines that a response to the first tax questions is needed. The response may be needed for any suitable reason, such as one of the following reasons: (a) to proceed with a tax topic currently being worked on by the user; (b) to accurately perform a tax calculation; or (c) it is the only remaining tax data required to complete the tax return. The tax system then dynamically generates a skipped tax question user interface presentation which includes the first tax question. The skipped tax question user interface presentation may also include an explanation as to why the first tax question is being asked again, such as explaining that the answer to the first tax question is needed to proceed with the tax topic currently being processed. The tax system presents the skipped tax question user interface presentation screen to the user.

In another aspect of the present invention, tax logic agent and/or the user interface manager, alone or in combination, are configured to perform the function of determining that a response to the first tax question is required such that the tax system generates and presents the skipped tax question user interface presentation.

In still another aspect of the present invention, the user interface manager is configured to perform the functions of dynamically generating a skipped tax question user interface presentation including the first tax question, and presenting the skipped tax question user interface presentation screen to the user.

In additional features of the present invention, the computing device may be a remotely located computing device that is separate from another computing device that contains a user interface. For example, a user may run a browser or application on a mobile device such as a laptop, tablet, Smartphone, or the like which contains the user interface. Of course, a personal computer may also be used in this manner in which a remotely located computer is used to implement core functions of the compliance program. A remotely located computing device may execute one or more modules of the system, for example, the calculation engine, the logic agent, and the user interface manager. Alternatively, software modules may be incorporated into a single computing device that includes the user interface aspect.

Another embodiment of the present invention is directed to computer-implemented methods for preparing a tax return for a taxpayer in which tax questions may be presented to a user in an ad hoc manner. The methods may be implemented, for example, on the tax system executing a tax program, same or similar to that described above. In one embodiment, the method includes a tax system executing a tax program. The tax program presents a first user interface presentation to a user, wherein the first user interface presentation includes a first tax question requesting from the user tax data for preparing the tax return. The tax program receives a prompt from the user to proceed to a second user interface presentation including one or more other tax questions different from the first tax question. The tax program generates and stores a skipped tax question record indicating that the first tax question was skipped. The tax program presenting a second user interface presentation to the user, wherein the second user interface presentation requesting one or more other tax data items different from the first tax question.

Then, after presenting the second user interface presentation, the tax program determines that a response to the first tax question is required for a reason, such as one of the following reasons: (a) to proceed with a tax topic currently being worked on by the user; (b) to accurately perform a tax calculation; or (c) it is the only remaining tax data required to complete the tax return. The tax program dynamically generates a skipped tax question user interface presentation including the first tax question. Finally, the tax program presents the skipped tax question user interface presentation to the user.

In additional aspects of present invention, the computer-implemented method may include any of the additional aspects described herein for the tax system for preparing a tax return in which tax questions may be presented to a user in an ad hoc manner.

Another embodiment of the present invention is directed to an article of manufacture comprising a non-transitory computer readable medium embodying instructions executable by a computer to execute a process according to any of the method embodiments of the present invention for preparing a tax return in which tax questions may be presented to a user in an ad hoc manner. For instance, the non-transitory computer readable medium embodying instructions executable by a computer may be configured to execute a process comprising: a tax system executing a tax program; the tax program presenting a first user interface presentation to a user, the first user interface presentation including a first tax question requesting from the user tax data for preparing the tax return; the tax program receiving a prompt from the user to proceed from the first user interface presentation without receiving a response to the first tax question; the tax program generating and storing a skipped tax question record indicating that the first tax question was skipped; the tax program presenting a second user interface presentation to the user, the second user interface presentation including one or more other tax questions different from the first tax question; after presenting the second user interface presentation, the tax program determining that a response to first tax question is required for one of the following reasons: (a) to proceed with a tax topic currently being worked on by the user; (b) to accurately perform a tax calculation; or (c) it is the only remaining tax data required to complete the tax return; the tax program dynamically generating a skipped tax question user interface presentation including the first tax question; and the tax program presenting the skipped tax question user interface presentation to the user.

In additional aspects, the article of manufacture may be further configured according to the additional aspects described herein for the methods for preparing a tax return in which tax questions may be presented to a user in an ad hoc manner.

It is understood that the steps of the methods and processes of the present invention are not required to be performed in the order as shown in the figures or as described, but can be performed in any order that accomplishes the intended purpose of the methods and processes.

The tax system of the present invention improves the functioning of the computer by providing faster and more flexible computing and generation of tax returns forms. The use of a calculation graph and a completion module allows the tax system to process and calculate a high volume of tax returns being prepared concurrently, or in short succession. The calculation graph and completion module also allow for more efficiently utilizing the computing power of the system by optimizing the number of tax questions required to be asked to obtain all of the required tax data for preparing a tax return and only requiring those calculations which are relevant to each respective tax return. These features increase the flexibility of the system, increase the speed of calculations resulting in faster calculations and reduced computer processing time, and require less memory resources when preparing and calculating compliance forms. Especially when preparing and calculating high volumes of tax returns, such as hundreds, thousands, millions or more per time period, such as a day, week or month, the tax system of the present invention significantly improves the operation of the computer, while also improving various technologies and/or technical fields, including computerized preparation of tax returns, computerized calculation of tax returns, and computerized form preparation systems. Accordingly, the present invention is rooted in computer technology involving specific computer components, intercommunications between computing modules, data structures and logic structures which improve the operation of the computer and also improve the technologies and technical fields recited above.

BRIEF DESCRIPTION OF THE DRAWINGS

FIG. 4 illustrates a decision table based on or derived from the completeness graph of FIG. 3.

FIG. 5 illustrates another embodiment of a decision table that incorporates statistical data.

FIG. 6A illustrates an example of a calculation graph, according to one embodiment.

FIGS. 13A and 13B illustrate a display of a computing device displaying a narrative explanation that was generated by the explanation engine. The narrative explanation contains multiple phrases that are linked that can be selected to provide additional detailed explanations.

FIGS. 14A and 14B illustrate a display of a computing device displaying a narrative explanation that was generated by the explanation engine. The narrative explanation contains multiple phrases that are linked that can be selected to provide additional detailed explanations.

DETAILED DESCRIPTION OF ILLUSTRATED EMBODIMENTS

Embodiments of the present invention are directed to systems, methods and articles of manufacture for preparing a tax return in which tax questions may be generated and presented to a user in an ad hoc manner. A tax return preparation system ("tax system") comprises a computing device executing a tax return preparation software program ("tax program"). The tax program is configured to display a plurality of user interface presentations, such as interview or question screens, with tax questions asking the user to provide tax data related to a taxpayer for preparing a tax return for the taxpayer. The tax program allows the user to skip a tax question on a user interface presentation, and proceed with subsequent user interface presentations. When the tax program determines that a response to the skipped tax questions is required for some reason, such as to provide an accurate tax calculation, to complete a tax topic, or to complete the entire tax return, the tax program dynamically generates a skipped tax question user interface presentation with the skipped tax question. The skipped tax question user interface presentation is then presented to the user, the user inputs a response to the skipped tax question, and the tax program then proceeds with the process of preparing the tax return.

Figure 16:
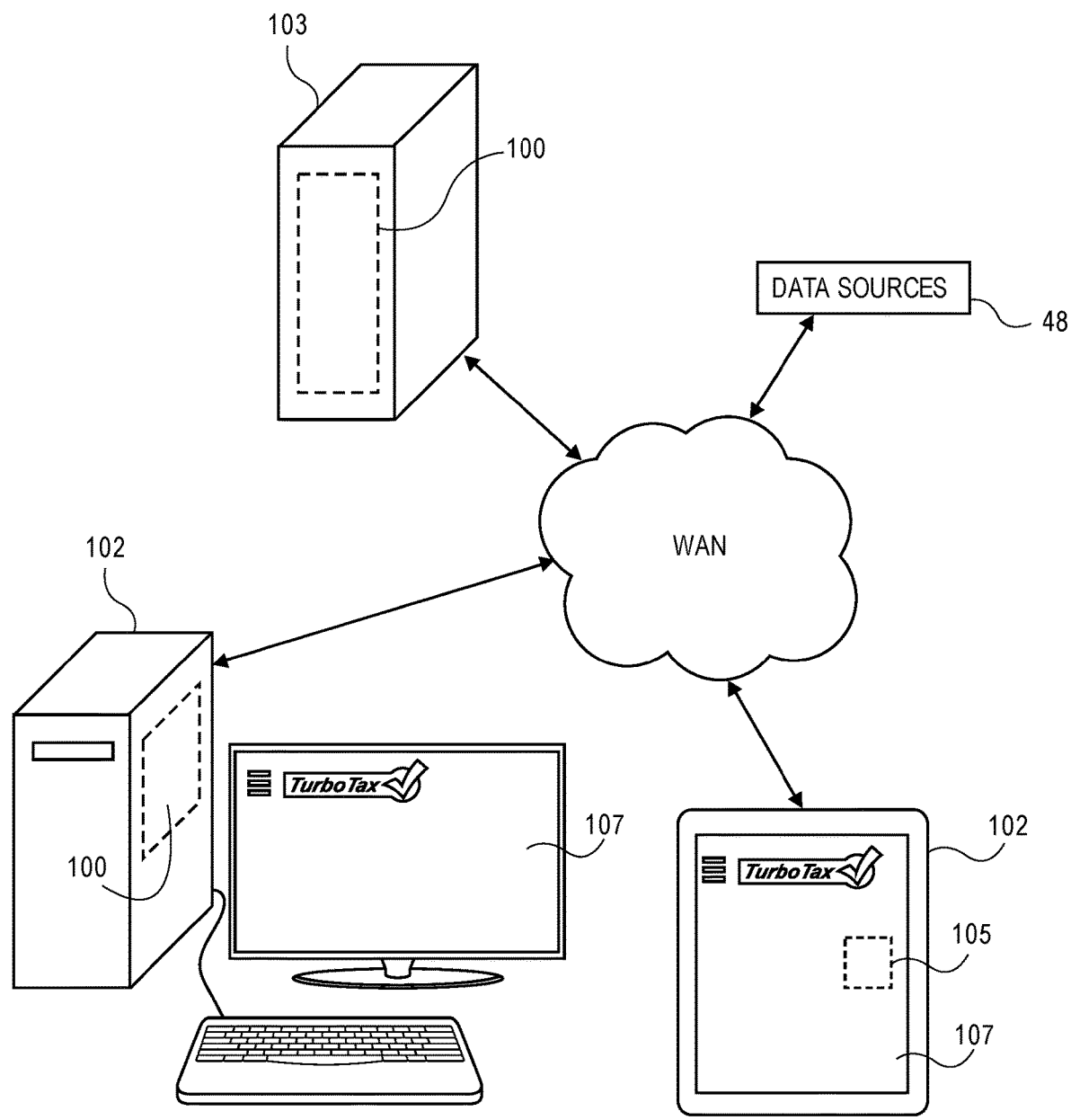
FIG. 16 illustrates the implementation of tax preparation software on various computing devices.

As described above, rather than utilizing the rigidly defined user interface screens used in prior iterations of tax preparation software, the present invention provides a tax return preparation software program 100 ("tax program 100") that runs on computing devices 102, 103 (see FIG. 16). The tax program operates on a new construct in which tax rules and the calculations based thereon are established in declarative data-structures, namely, a completeness module and a tax calculation graph. The completeness module 11 may include a completeness graph 12 (which may include one or more completeness graphs) embodied in a decision tree and/or decision tables 30 (e.g., the decision tables may be generated from completeness graph(s), as described herein) (see FIG. 7). The completeness graph 12 (which may include one or more completeness graphs; see e.g., FIGS. 1-3) and tax calculation graph 14 (see e.g., FIGS. 6A-6B) are data structures in the form of trees having nodes and interconnections between the nodes indicating interdependencies. Completeness graph 12 identifies each of the conditions (e.g. questions, criteria, conditions) which may be required to be satisfied to complete a particular tax topic or a complete tax return, and also identifies when all conditions have been satisfied to complete a particular tax topic or, a complete, file-able tax return. The tax calculation graph 14 semantically describe data dependent nodes, including input nodes, functional nodes, functions, and tax operations, that perform tax calculations or operations in accordance with tax code or tax rules. Examples of these data structures are described in U.S. patent application Ser. Nos. 14/097,057 and 14/448,886, both of which are incorporated by reference as if set forth fully herein.

Use of these data-structures permits the user interface to be loosely connected or even detached from the tax calculation engine and the data used in the tax calculations. For instance, tax calculations may be dynamically calculated based on tax data derived from sourced data, estimates, user input, or even intermediate tax calculations that are then utilized for additional tax calculations. A smart tax logic agent running on a set of rules can access current run time data, evaluate missing data fields and propose suggested questions to be asked to a user to fill in missing blanks. This process can be continued until completeness of all tax topics has occurred. A tax return can then be prepared and filed with respect to the relevant taxing jurisdictions.

Figure 1:
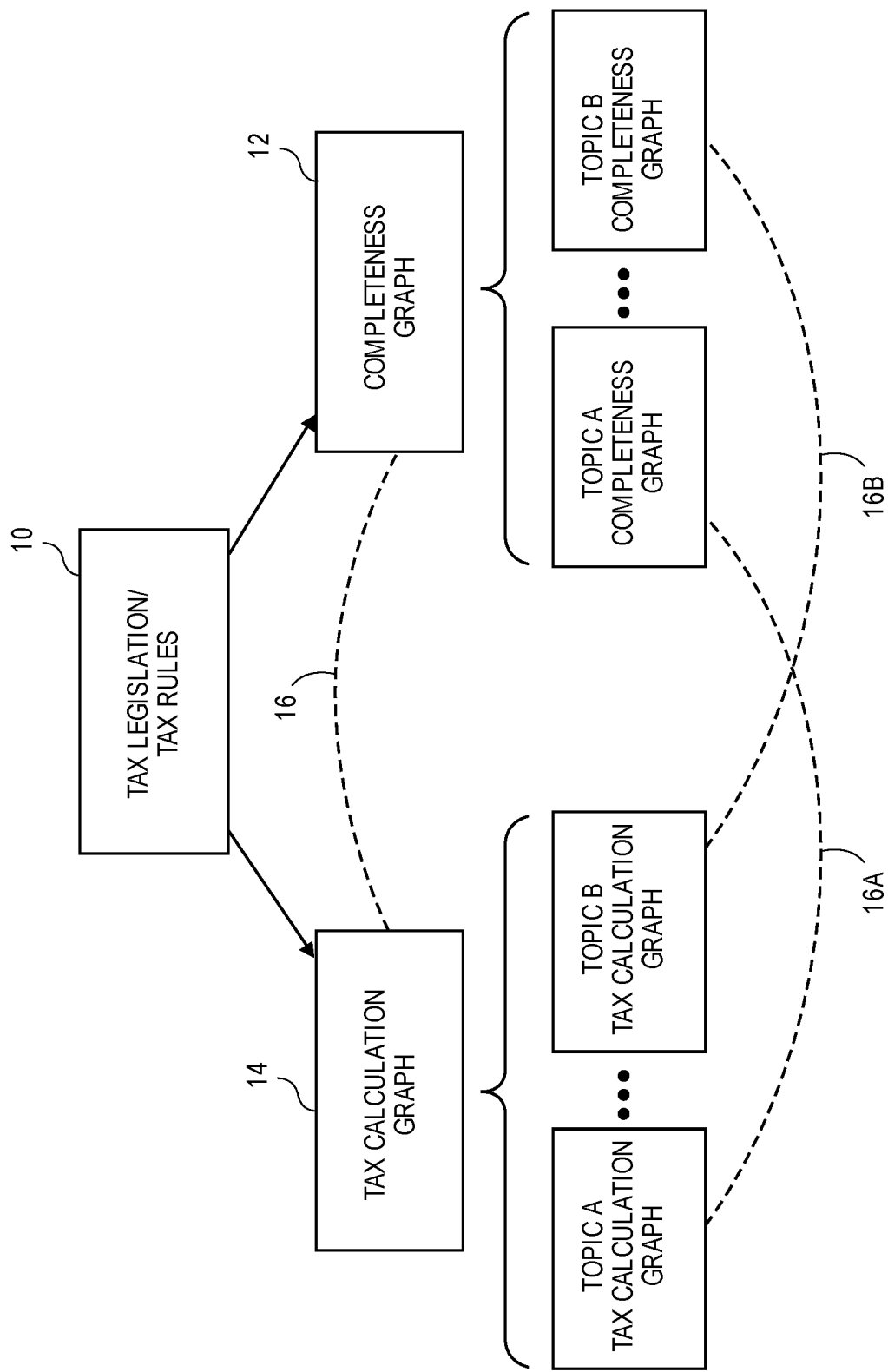
FIG. 1 schematically illustrates how tax legislation/tax rules are parsed and represented by a completeness graph and a tax calculation graph.

FIG. 1 illustrates graphically how tax legislation/tax rules 10 are broken down into a completeness graph 12 and a tax calculation graph 14. In one aspect of the invention, tax legislation or rules 10 are parsed or broken into various topics. For example, there may be nearly one hundred topics that need to be covered for completing a federal tax return. When one considers both federal and state tax returns, there can be well over one hundred tax topics that need to be covered. When tax legislation or tax rules 10 are broken into various topics or sub-topics, in one embodiment of the invention, each particular topic (e.g., topics A, B) may each have their own dedicated completeness graph 12A, 12B and tax calculation graph 14A, 14B as seen in FIG. 1.

Note that in FIG. 1, the completeness graph 12 and the tax calculation graph 14 are interdependent as illustrated by dashed line 16. That is to say, some elements contained within the completeness graph 12 are needed to perform actual tax calculations using the tax calculation graph 14. Likewise, aspects within the tax calculation graph 14 may be needed as part of the completion graph 12. Taken collectively, the completeness graph 12 and the tax calculation graph 14 represent data structures that capture all the conditions necessary to complete the computations that are required to complete a tax return that can be filed. The completeness graph 12, for example, determines when all conditions have been satisfied such that a "fileable" tax return can be prepared with the existing data. The completeness graph 12 is used to determine, for example, that no additional data input is needed to prepare and ultimately print or file a tax return. The completeness graph 12 is used to determine when a particular schema contains sufficient information such that a tax return can be prepared and filed. Individual combinations of completeness graphs 12 and tax calculation graphs 14 that relate to one or more topics can be used to complete the computations required for some subcalculation. In the context of a tax setting, for example, a sub-selection of topical completeness graphs 12 and tax calculation graphs 14 can be used for intermediate tax results such as Adjusted Gross Income (AGI) or Taxable Income (TI), itemized deductions, tax credits, and the like.

Figure 2:
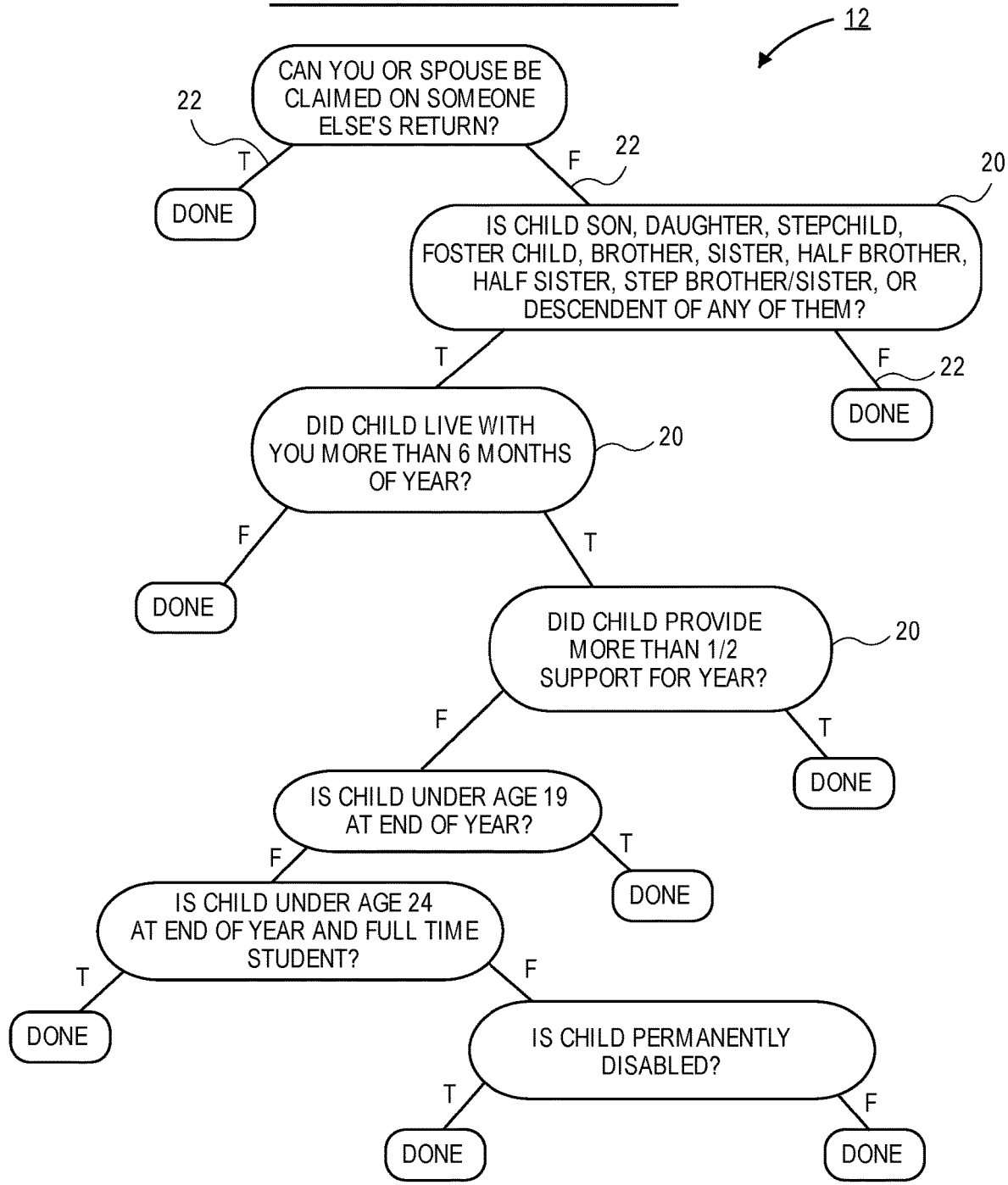
FIG. 2 illustrates an example of a simplified version of a completeness graph related to a qualifying child for purposes of determining deductions for federal income tax purposes.

The completeness graph 12 and the tax calculation graph 14 represent data structures that can be constructed in the form of a tree. FIG. 2 illustrates a completeness graph 12 in the form of a tree with nodes 20 and arcs 22 representing a basic or general version of a completeness graph 12 for the topic of determining whether a child qualifies as a dependent for federal income tax purposes. A more complete flow chart-based representation of questions related to determining a "qualified child" may be found in U.S. patent application Ser. No. 14/097,057, which is incorporated by reference herein. Each node 20 contains a condition that in this example is expressed as a Boolean expression that can be answered in the affirmative or negative. The arcs 22 that connect each node 20 illustrate the dependencies between nodes 20. The combination of arcs 22 in the completeness graph 12 illustrates the various pathways to completion. A single arc 22 or combination of arcs 22 that result in a determination of "Done" represent a pathway to completion. As seen in FIG. 2, there are several pathways to completion. For example, one pathway to completion is where an affirmative (True) answer is given to the question of whether you or a spouse can be claimed on someone else's tax return. If such a condition is true, your child is not a qualifying dependent because under IRS rules you cannot claim any dependents if someone else can claim you as a dependent. In another example, if you had a child and that child did not live with you for more than 6 months of the year, then your child is not a qualifying dependent. Again, this is a separate IRS requirement for a qualified dependent.

Given the complexities and nuances of the tax code, many tax topics may contain completeness graphs 12 that have many nodes with a large number of pathways to completion. However, many branches or lines within the completeness graph 12 can be ignored, for example, when certain questions internal to the completeness graph 12 are answered that eliminate other nodes 20 and arcs 22 within the completeness graph 12. The dependent logic expressed by the completeness graph 12 allows one to minimize subsequent questions based on answers given to prior questions. This allows a minimum question set that can be generated that can be presented to a user as explained herein.

Figure 3:
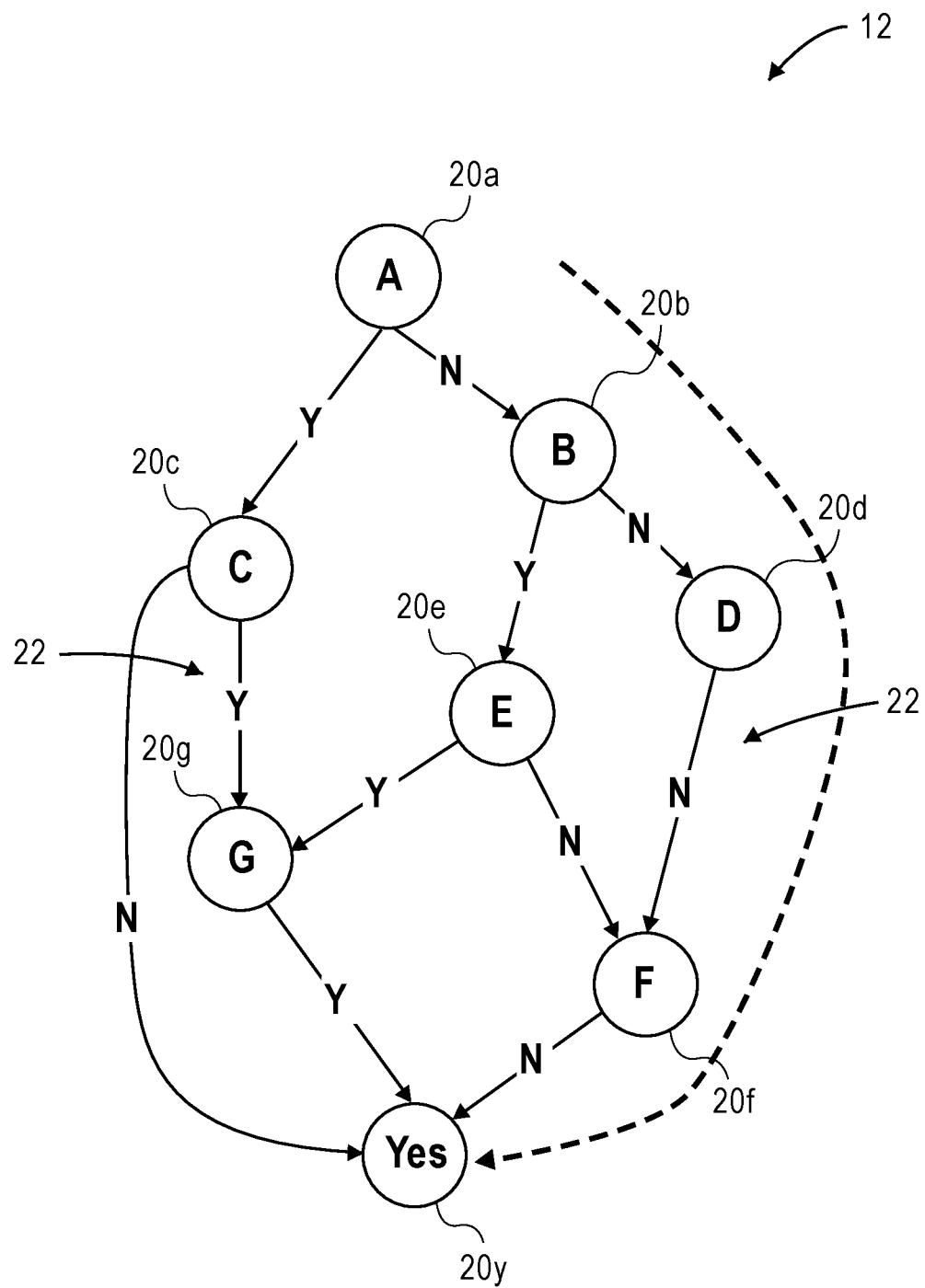
FIG. 3 illustrates another illustration of a completeness graph.

FIG. 3 illustrates another example of a completeness graph 12 that includes a beginning node 20a (Node A), intermediate nodes 20b-g (Nodes B-G) and a termination node 20y (Node "Yes" or "Done"). Each of the beginning node 20a and intermediate nodes 20a-g represents a question. Inter-node connections or arcs 22 represent response options. In the illustrated embodiment, each inter-node connection 22 represents an answer or response option in binary form (Y/N), for instance, a response to a Boolean expression. It will be understood, however, that embodiments are not so limited, and that a binary response form is provided as a non-limiting example. In the illustrated example, certain nodes, such as nodes A, B and E, have two response options 22, whereas other nodes, such as nodes D, G and F, have one response option 22.

As explained herein, the directed graph or completion graph 12 that is illustrated in FIG. 3 can be traversed through all possible paths from the start node 20a to the termination node 20y. By navigating various paths through the completion graph 12 in a recursive manner, the system can determine each path from the beginning node 20a to the termination node 20y. The completion graph 12 along with the pathways to completion through the graph can be converted into a different data structure or format. In the illustrated embodiment shown in FIG. 4, this different data structure or format is in the form of a decision table 30. In the illustrated example, the decision table 30 includes rows 32 (five rows 32a-e are illustrated) based on the paths through the completion graph 12. In the illustrated embodiment, the columns 34a-g of the completion graph represent expressions for each of the questions (represented as nodes A-G in FIG. 3) and answers derived from completion paths through the completion graph 12 and column 34h indicates a conclusion, determination, result or goal 34h concerning a tax topic or situation, e.g., "Yes—your child is a qualifying child" or "No—your child is not a qualifying child."

Referring to FIG. 4, each row 32 of the decision table 30 represents a tax rule. The decision table 30, for example, may be associated with a federal tax rule or a state tax rule. In some instances, for example, a state tax rule may include the same decision table 30 as the federal tax rule. The decision table 30 can be used, as explained herein, to drive a personalized interview process for the user of tax program 100. In particular, the decision table 30 is used to select a question or questions to present to a user during an interview process. In this particular example, in the context of the completion graph from FIG. 3 converted into the decision table 30 of FIG. 4, if the first question presented to the user during an interview process is question "A" and the user answers "Yes" rows 32c-e may be eliminated from consideration given that no pathway to completion is possible. The tax rule associated with these columns cannot be satisfied given the input of "Yes" in question "A." Note that those cell entries denoted by "?" represent those answers to a particular question in a node that are irrelevant to the particular pathway to completion. Thus, for example, referring to row 34a, when an answer to $Q_A$ is "Y" and a path is completed through the completion graph 12 by answering Question C as "N" then answers to the other questions in Nodes B and D-F are "?" since they are not needed to be answered given that particular path.

After an initial question has been presented and rows are eliminated as a result of the selection, next, a collection of candidate questions from the remaining available rows 32a and 32b is determined. From this universe of candidate questions from the remaining rows, a candidate question is selected. In this case, the candidate questions are questions $Q_c$ and $Q_G$ in columns 34c, 34g, respectively. One of these questions is selected and the process repeats until either the goal 34h is reached or there is an empty candidate list.

FIG. 5 illustrates another embodiment of a decision table 30. In this embodiment, the decision table 30 includes additional statistical data 36 associated with each rule (e.g., rules $R_1$-$R_6$). For example, the statistical data 36 may represent a percentage or the like in which a particular demographic or category of user(s) satisfies this particular path to completion. The statistical data 36 may be mined from existing or current year tax filings. The statistical data 36 may be obtained from a proprietary source of data such as tax filing data owned by Intuit, Inc. The statistical data 36 may be third party data that can be purchased or leased for use. For example, the statistical data 36 may be obtained from a government taxing authority or the like (e.g., IRS). In one aspect, the statistical data 36 does not necessarily relate specifically to the individual or individuals preparing the particular tax return. For example, the statistical data 36 may be obtained based on a number of tax filers which is then classified into one or more classifications. For example, statistical data 36 can be organized with respect to age, type of tax filing (e.g., joint, separate, married filing separately), income range (gross, AGI, or TI), deduction type, geographic location, and the like).

FIG. 5 illustrates two such columns 38a, 38b in the decision table 30 that contain statistical data 36 in the form of percentages. For example, column 38a (STAT1) may contain a percentage value that indicates taxpayers under the age of thirty-five where $Rule_1$ is satisfied. Column 38b (STAT2) may contain a percentage value that indicates taxpayers over the age of thirty-five where $Rule_1$ is satisfied. Any number of additional columns 38 could be added to the decision table 30 and the statistics do not have to relate to an age threshold or grouping. The statistical data 36 may be used, as explained in more detail below, by the tax program 100 to determine which of the candidate questions ($Q_A$-$Q_G$) should be asked to a taxpayer. The statistical data 36 may be compared to one or more known taxpayer data fields (e.g., age, income level, tax filing status, geographic location, or the like) such that the question that is presented to the user is most likely to lead to a path to completion. Candidate questions may also be excluded or grouped together and then presented to the user to efficiently minimize tax interview questions during the data acquisition process. For example, questions that are likely to be answered in the negative can be grouped together and presented to the user in a grouping and asked in the negative—for example, "we think these question do not apply to you, please confirm that this is correct." This enables the elimination of many pathways to completion that can optimize additional data requests of the taxpayer.

FIG. 6A illustrates an example of a tax calculation graph 14. The tax calculation graph 14 semantically describes data dependent tax operations that are used to perform a tax calculation in accordance with the tax code or tax rules 10. The tax calculation graph 14 in FIG. 6A is a simplified view of data dependent tax operations that are used to determine the taxes Due (taxDue) based on various sources of income, deductions, exemptions, and credits. The tax calculation graph 14 is a type of directed graph (which may be composed of a plurality of directed graphs) and, in most situations relevant to tax calculations, is a directed acyclic graph that encodes the data dependencies amongst tax concepts or topics.

In FIG. 6A, various nodes 24 are leaf or input nodes. Examples of leaf nodes 24 in this particular example include data obtained from W-2 forms, data obtained from 1099-INT forms, data obtained from other investment income (INV), filing status, and number of dependents. Typically, though not exclusively, leaf nodes 24 are populated with user inputs. That is to say the user (e.g. a taxpayer) will enter this information from a user interface as described herein. In other embodiments, however, the leaf nodes 24 may be populated with information that is automatically obtained by the tax program 100. For example, in some embodiments, tax documents may be imaged or scanned with relevant data being automatically extracted using Object Character Recognition (OCR) techniques. In other embodiments, prior tax returns may be used by the tax program 100 to extract information (e.g., name, potential dependents, address, and social security number) which can then be used to populate the leaf nodes 24. Online resources such as financial services websites or other user-specific websites can be crawled and scanned to scrape or otherwise download tax related information that can be automatically populated into leaf nodes 24. Additional third party information sources such as credit bureaus, government databases, and the like can also be used by the tax program 100 to obtain information that can then be populated in to respective leaf nodes 24.

In still other embodiments, values for leaf nodes 24 may be derived or otherwise calculated. For example, while the number of dependents may be manually entered by a taxpayer, those dependents may not all be "qualifying" dependents for tax purposes. In such instances, the actual number of "qualified" dependents may be derived or calculated by the tax program 100. In still other embodiments, values for leaf nodes 24 may be estimated as described herein.

Still other internal nodes, referred to as functional nodes 26, semantically represent a tax concept and may be calculated or otherwise determined using a function node 28 (also referred to as a "function 28"). The functional node 26 and the associated function 28 define a particular tax operation 29. For example, as seen in FIG. 6A, tax operation 29 refers to total wage income and is the result of the accumulator function 28 summing all W-2 income from leaf nodes 24. The functional node 26 may include a number in some instances. In other instances, the functional node 26 may include a response to a Boolean expression such as "true" or "false." The functional nodes 26 may also be constant values in some instances. Some or all of these functional nodes 26 may be labeled as "tax concepts" or "tax topics." The combination of a functional node 26 and its associated function 28 relate to a specific tax operation 29 as part of the tax topic.

Interconnected functional node 26 containing data dependent tax concepts or topics are associated with a discrete set of functions 28 that are used to capture domain specific patterns and semantic abstractions used in the tax calculation. The discrete set of functions 28 that are associated with any particular functional node may be commonly re-occurring operations for functions that are used throughout the process of calculating tax liability. For instance, examples of such commonly reoccurring functions 28 include copy, capping, thresholding, accumulation or adding, look-up operations, phase out calculations, comparison calculations, exemptions, exclusions, and the like.

In one embodiment, the entire set of functions 28 that is used to compute or calculate a tax liability is stored within a data store 30 which in some instances may be a database. The various functions 28 that are used to semantically describe data connections between functional nodes 26 can be called upon by the tax program 100 for performing tax calculations. Utilizing these common functions 28 greatly improves the efficiency of the tax program 100 and can be used by a programmer to more easily track and follow the complex nature of the ever-evolving tax code. The common functions 28 also enable easier updating of the tax program 100 because as tax laws and regulations change, fewer changes need to be made to the software code as compared to prior hard-wired approaches.

Importantly, the tax calculation graph 14 and the associated functional node 26 and functions 28 can be tagged and later be used or called upon to intelligently explain to the user the reasoning behind why a particular result was calculated or determined by the tax program 100 program, as explained in more detail below. The functions 28 can be de-coupled from a specific narrow definition and instead be associated with one or more explanations. Examples of common functions 28 found in tax legislation and tax rules include the concepts of "caps" or "exemptions" that are found in various portions of the tax code. One example of a "cap" is the portion of the U.S. tax code that limits the ability of a joint filer to deduct more than $3,000 of net capital losses in any single tax year. There are many other instances of such caps. An example of an "exemption" is one that relates to early distributions from retirement plans. For most retirement plans, early distributions from qualified retirement plans prior to reaching the age of fifty nine and one-half (59½) require a 10% penalty. This penalty can be avoided, however, if an exemption applies such as the total and permanent disability of the participant. Other exemptions also apply. Such exemptions are found throughout various aspects of the tax code and tax regulations.

In some embodiments, the function node 28 may include any number of mathematical or other operations. Examples of functions 28 include summation, subtraction, multiplication, division, and look-ups of tables or values from a database 30 or library as is illustrated in FIG. 6A. It should be understood that the functional node 26 within completion graph 12 and the tax calculation graph 14 may be shared in some instances. For example, AGI is a re-occurring tax concept that occurs in many places in the tax code. AGI is used not only for the mathematical computation of taxes but is also used, for example, to determine eligibility of certain tax deductions and credits. Thus, the AGI node is common to both the completion graph 12 and the tax calculation graph 14.

Figure 6B:
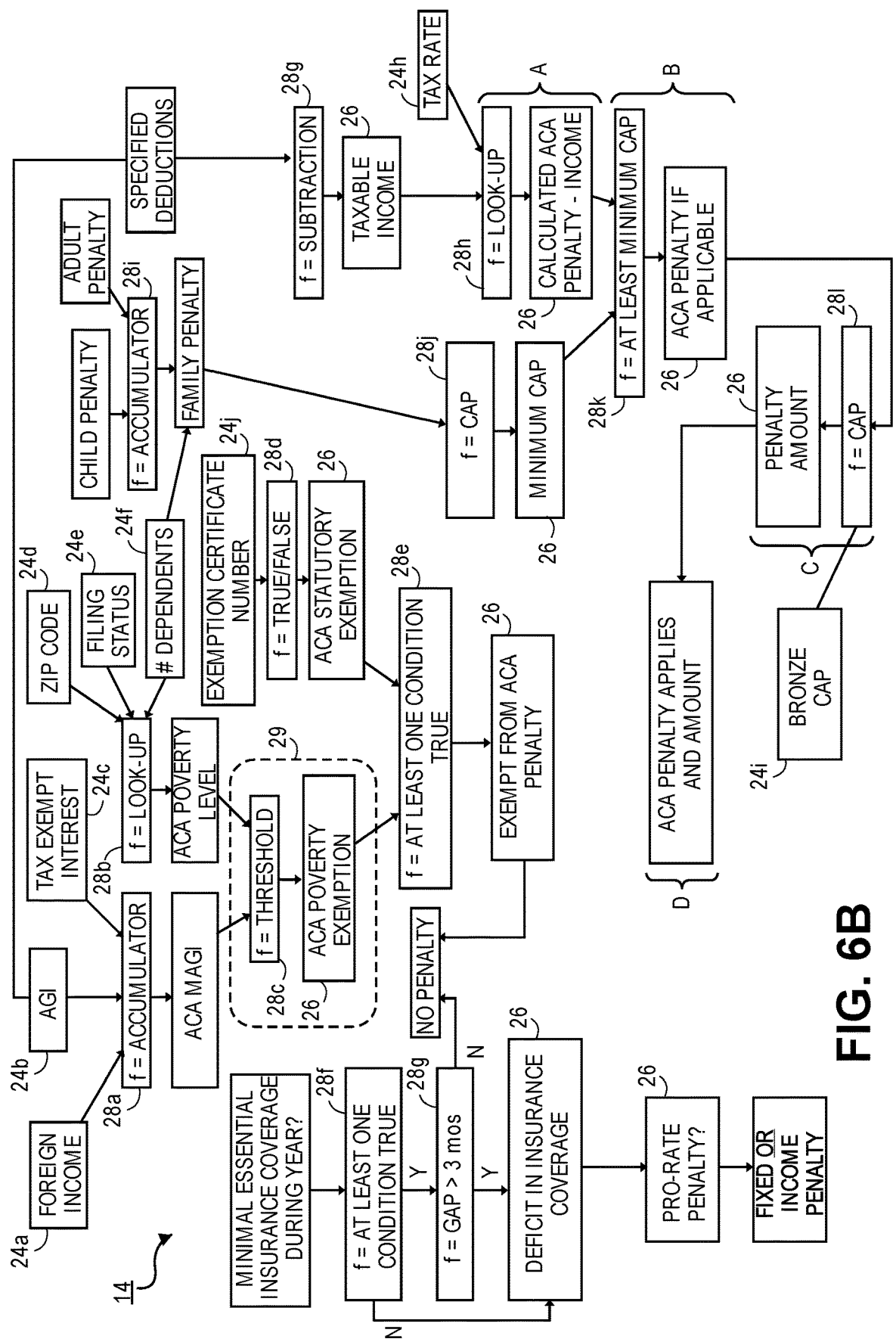
FIG. 6B illustrates an example of a calculation graph that relates to the determination and calculation of a shared responsibility penalty under the Affordable Care Act, according to one embodiment.

FIG. 6B illustrates a detailed example of a tax calculation graph 14 that is used to calculate the amount of penalty under the Affordable Care Act (ACA). Under the ACA, taxpayers are required to have minimum essential health coverage for each month of the year, qualify for an exemption, or make a shared responsibility penalty payment when filing his or her federal tax return. FIG. 6B illustrates a calculation graph of a process used to calculate a taxpayer's shared responsibility payment under the ACA (referred to herein as an ACA penalty). FIG. 6B illustrates, for example, various leaf nodes 24a-24j used as part of this calculation to determine the ACA penalty. Leaf nodes 24a-24f are used to calculate the modified adjusted gross income (ACA MAGI) as well as the applicable ACA poverty level. One can see how the accumulator function 28a is used to generate the ACA MAGI in this example by adding foreign income 14a, AGI 24b, and tax exempt interest 24c. Likewise, a look-up function 28b can be used to determine the applicable ACA poverty level based on the taxpayer's zip code 24d, filing status 24e, and number of dependents 24f. The ACA MAGI and the ACA poverty level are then subject to a thresholding function 28c to determine whether the ACA poverty level exemption applies. Under the ACA, if a taxpayer cannot afford basic coverage because the minimum amount one must pay for the premiums exceeds a percentage of household income (i.e., 8%), one is exempt from obtaining minimum essential coverage.

Still referring to FIG. 6B, a taxpayer may be exempt from the requirement to obtain minimum essential coverage by obtaining a different statutory exemption. These exemptions include: religious conscience, health care sharing ministry, a member of Indian tribe, short coverage gap (less than 3 consecutive months), hardship, affordability (already mentioned above), incarceration, and not lawfully present. A true/false Boolean function 28d may be used to determine whether an Exemption Certificate Number (ECN) has been obtained from the taxpayer certifying that one of the statutory exemptions has been satisfied. Another threshold function 28e is applied to determine whether one of the statutory exemptions is satisfied (e.g., affordability or others). If at least one of these statutory conditions is met then the taxpayer is exempt from the ACA shared responsibility payment penalty.

As seen in FIG. 6B, if a taxpayer has obtained minimal essential coverage during the year, there is still the possibility that a penalty may be owed because under the ACA, if there is a gap in coverage for a covered member of the family of more than three (3) months, at least some penalty amount is owed. Function 28f (at least one condition true) is used to determine if there was minimum essential coverage during the year for any period. Function 28g (gap>3 months) is used to determine the gap in coverage in order to gaps in coverage that exceed the 3 month statutory requirement. The gap in coverage penalty, however, may be pro-rated based on the length of the gap in coverage as indicated in FIG. 6B.

In the event there is a penalty, the ACA requires that the penalty be the greater of a percentage of income, net of specified deductions, or a specified penalty that is applied per individual or family. For example, for the 2015 year, the percentage is 2.0 percent and increases to 2.5 percent in subsequent years. FIG. 6B illustrates the use of a subtraction function 28g that utilizes the AGI node 24b to arrive at a taxable income value. A look-up function 28h is used to obtain the applicable tax rate (e.g., 2.0% for 2015) and is used to calculate the income-based ACA penalty.

In order to determine the non-income or "fixed" penalty, an accumulator function 28i is used to determine the penalty. In this example, the calculation pertains to a family wherein the penalty includes a fixed amount for a child ($162.50 per child in 2015) and a fixed amount per adult ($325.00 per adult). Under the ACA, there is a maximum cap of this fixed penalty. For example, in 2015, the maximum family penalty is $975. As seen in FIG. 6B, a cap function 28j is used to determine the minimum cap. Another function 28k that is referred to as "at least minimum cap" is used to determine the greater of the fixed penalty or the income-based penalty. If the income-based penalty is higher than the fixed amount then that value is used, otherwise the fixed penalty amount is used. Still referring to FIG. 6B, another cap function 28l is used to determine whether the penalty has exceeded another cap that is part of the ACA law. Under the ACA, the overall penalty is capped at the national average premium for a bronze level insurance plan. The cap function 28l is used to ensure that the calculated penalty (i.e., the income based penalty) does not exceed this amount. After application of the cap function 28l, the ACA penalty amount is determined.

As seen in FIG. 6B, there are a variety of different functions 28 that are employed as part of the process used to calculate any applicable penalty under the ACA. In some instances, a common function (e.g., cap functions 28j and 28l) is found in multiple locations within the tax calculation graph 14. It should be understood that the functions 28 illustrated in FIG. 6B are illustrative as other functions may be used beyond those specifically illustrated in the drawings.

Figure 7:
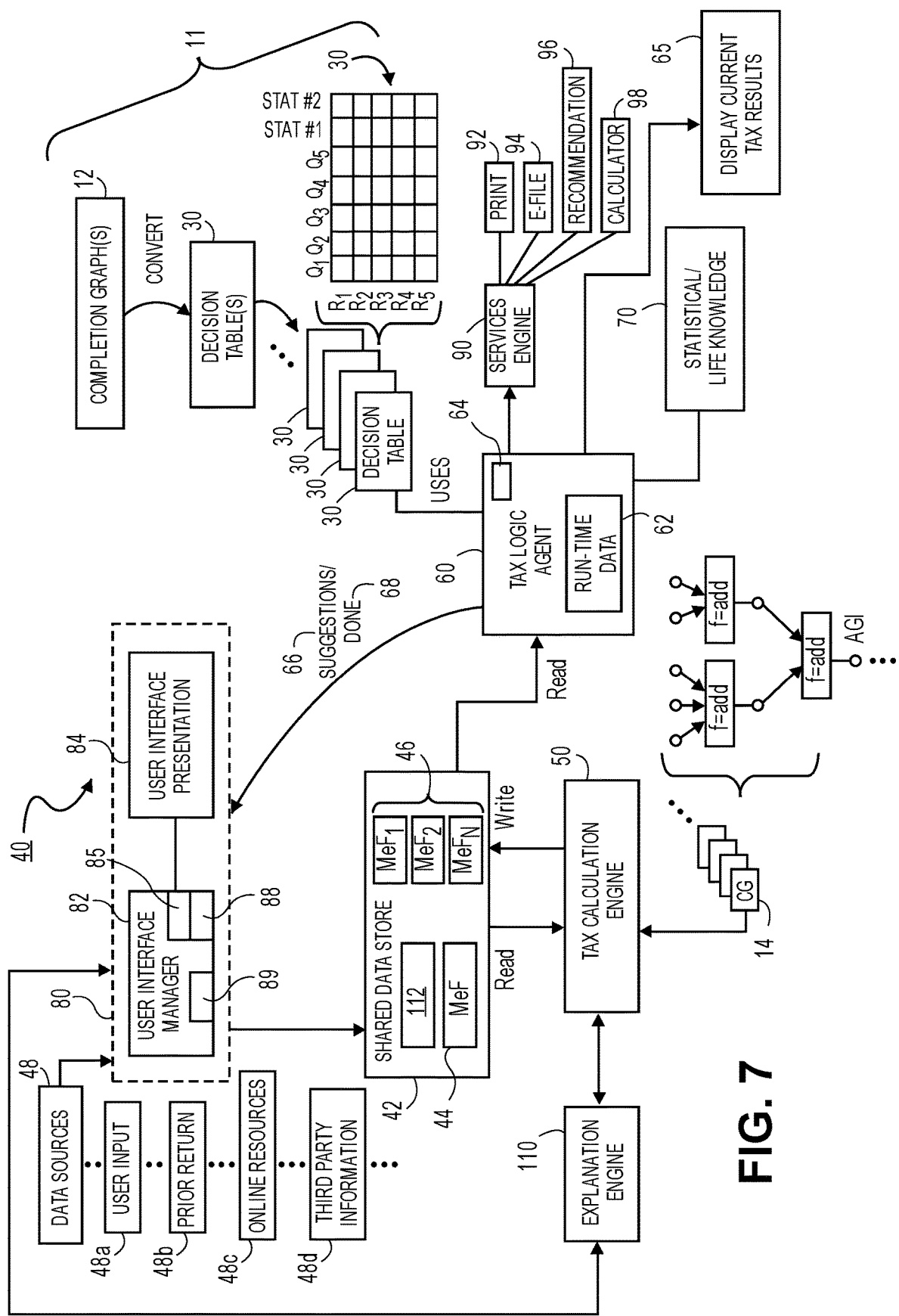
FIG. 7 schematically illustrates a system for preparing a tax return in which tax questions may be generated and presented in an ad hoc manner, according to one embodiment.

FIG. 7 schematically illustrates a tax return preparation system 40 (also referred to as "tax system 40" and "system 40"), as embodied in the tax program 100, for calculating taxes using rules and calculations based on declarative data structures according to one embodiment. The system 40 includes a shared data store 42 that contains therein a schema 44 or canonical model representative to the data fields utilized or otherwise required to complete a tax return. The shared data store 42 may be a repository, file, or database that is used to contain the tax-related data fields. The shared data store 42 is accessible by a computing device 102, 103 as described herein (e.g., FIG. 13). The shared data store 42 may be located on the computing device 102, 103 running the tax program 100 or it may be located remotely, for example, in cloud environment on another, remotely located computer. The schema 44 may include, for example, a schema based on the Modernized e-File (MeF) system developed by the Internal Revenue Service. The MeF is a web-based system that allows electronic filing of tax returns through the Internet. MeF uses extensible markup language (XML) format that is used when identifying, storing, and transmitting data. For example, each line or data element on a tax return is given an XML name tag as well as every instance of supporting data. Tax program 100 uses XML schemas and business rules to electronically prepare and transmit tax returns to tax reporting agencies. Transmitters use the Internet to transmit electronic tax return data to the IRS MeF system. The IRS validates the transmitted files against the XML schemas and Business Rules in the MeF schema 44.

The schema 44 may be a modified version of the MeF schema used by the IRS. For example, the schema 44 may be an extended or expanded version (designated MeF++) of the MeF model established by government authorities that utilizes additional fields. While the particular MeF schema 44 is discussed herein the invention is not so limited. There may be many different schemas 44 depending on the different tax jurisdiction. For example, Country A may have a tax schema 44 that varies from Country B. Different regions or states within a single country may even have different schemas 44. The systems and methods described herein are not limited to a particular schema 44 implementation. The schema 44 may contain all the data fields required to prepare and file a tax return with a government taxing authority. This may include, for example, all fields required for any tax forms, schedules, and the like. Data may include text, numbers, and a response to a Boolean expression (e.g., True/False or Yes/No). As explained in more detail, the shared data store 42 may, at any one time, have a particular instance 46 of the MeF schema 44 (for MeF++ schema) stored therein at any particular time. For example, FIG. 7 illustrates several instances 46 of the MeF schema 44 (labeled as MeF$_1$, MeF$_2$, MeF$_N$). These instances 46 may be updated as additional data is input into the shared data store 42.

As seen in FIG. 7, the shared data store 42 may import data from one or more data sources 48. A number of data sources 48 may be used to import or otherwise transfer tax related data to the shared data store 42. This may occur through a user interface control 80 as described herein or, alternatively, data importation may occur directly to the shared data store 42 (not illustrated in FIG. 7). The tax related data may include personal identification data such as a name, address, or taxpayer ID. Tax data may also relate to, for example, details regarding a taxpayer's employer(s) during a preceding tax year. This may include, employer name, employer federal ID, dates of employment, and the like. Tax related day may include residential history data (e.g., location of residence(s) in tax reporting period (state, county, city, etc.) as well as type of housing (e.g., rental unit or purchased home). Tax related information may also include dependent-related information such as the number of family members in a household including children. Tax related information may pertain to sources of income, including both earned and unearned income as well. Tax related information also include information that pertains to tax deductions or tax credits. Tax related information may also pertain to medical insurance information. For example, under the new ACA many taxpayers may obtain health insurance through a state or federal marketplace. Such a marketplace may have information stored or accessible that is used in connection with preparing a tax return. Tax information related to premiums paid, coverage information, subsidy amounts (if any), and enrolled individuals can be automatically imported into the shared data store 42.

For example, user input 48*a* is one type of data source 48. User input 48*a* may take a number of different forms. For example, user input 48*a* may be generated by a user using, for example, an input device such as keyboard, mouse, touchscreen display, voice input (e.g., voice to text feature). photograph or image, or the like to enter information manually into the tax program 100. For example, as illustrated in FIG. 7, user interface manager 82 contains an import module 89 that may be used to select what data sources 48 are automatically searched for tax related data. Import module 89 may be used as a permission manager that includes, for example, user account numbers and related passwords. The UI control 80 enables what sources 48 of data are searched or otherwise analyzed for tax related data. For example, a user may select prior year tax returns 48*b* to be searched but not online resources 48*c*. The tax data may flow through the UI control 80 directly as illustrated in FIG. 7 or, alternatively, the tax data may be routed directly to the shared data store 42. The import module 89 may also present prompts or questions to the user via a user interface presentation 84 generated by the user interface manager 82. For example, a question may ask the user to confirm the accuracy of the data. For instance, the user may be asked to click a button, graphic, icon, box or the like to confirm the accuracy of the data prior to or after the data being directed to the shared data store 42. Conversely, the interface manager 82 may assume the accuracy of the data and ask the user to click a button, graphic, icon, box or the like for data that is not accurate. The user may also be given the option of whether or not to import the data from the data sources 48.

User input 48*a* may also include some form of automatic data gathering. For example, a user may scan or take a photographic image of a tax document (e.g., W-2 or 1099) that is then processed by the tax program 100 to extract relevant data fields that are then automatically transferred and stored within the data store 42. OCR techniques along with pre-stored templates of tax reporting forms may be called upon to extract relevant data from the scanned or photographic images whereupon the data is then transferred to the shared data store 42.

Another example of a data source 48 is a prior year tax return 48*b*. A prior year tax return 48*b* that is stored electronically can be searched and data is copied and transferred to the shared data store 42. The prior year tax return 48*b* may be in a proprietary format (e.g., .txf, .pdf) or an open source format. The prior year tax return 48*b* may also be in a paper or hardcopy format that can be scanned or imaged whereby data is extracted and transferred to the shared data store 42. In another embodiment, a prior year tax return 48*b* may be obtained by accessing a government database (e.g., IRS records).

An additional example of a data source 48 is an online resource 48*c*. An online resource 48*c* may include, for example, websites for the taxpayer(s) that contain tax-related information. For example, financial service providers such as banks, credit unions, brokerages, investment advisors typically provide online access for their customers to view holdings, balances, and transactions. Financial service providers also typically provide year-end tax documents to their customers such as, for instance, 1099-INT (interest income), 1099-DIV (dividend income), 1099-B (brokerage proceeds), 1098 (mortgage interest) forms. The data contained on these tax forms may be captured and transferred electronically to the shared data store 42.

Of course, there are additional examples of online resources 48c beyond financial service providers. For example, many taxpayers may have social media or similar accounts. These include, by way of illustration and not limitation, Facebook, Linked-In, Twitter, and the like. User's may post or store personal information on these properties that may have tax implications. For example, a user's Linked-In account may indicate that a person changed jobs during a tax year. Likewise, a posting on Facebook about a new home may suggest that a person has purchased a home, moved to a new location, changed jobs; all of which may have possible tax ramifications. This information is then acquired and transferred to the shared data store 42, which can be used to drive or shape the interview process described herein. For instance, using the example above, a person may be asked a question whether or not she changed jobs during the year (e.g., "It looks like you changed jobs during the past year, is this correct?". Additional follow-up questions can then be presented to the user.

Still referring to FIG. 7, another data source 48 includes sources of third party information 48d that may be accessed and retrieved. For example, credit reporting bureaus contain a rich source of data that may implicate one or more tax items. For example, credit reporting bureaus may show that a taxpayer has taken out a student loan or home mortgage loan that may be the source of possible tax deductions for the taxpayer. Other examples of sources of third party information 48d include government databases. For example, the state department of motor vehicles may contain information relevant to tax portion of vehicle registration fees which can be deductible in some instances. Other government databases that may be accessed include the IRS (e.g., IRS tax return transcripts), and state taxing authorities. Third party resources 48d may also include one of the state-based health insurance exchanges or the federal health insurance exchange (e.g., www.healthcare.gov).

Referring briefly to FIG. 16, the tax program 100 including the system 40 of FIG. 7 is executed by the computing device 102, 103. Referring back to FIG. 7, the tax return preparation software 100 executed by the computing device 102, 103 includes a tax calculation engine 50 that computes one or more tax calculations based on the tax calculation graph(s) 14 and the available data at any given instance within the schema 44 in the shared data store 42. The tax calculation engine 50 may calculate a final tax due amount, a final refund amount, or one or more intermediary calculations (e.g., taxable income, AGI, earned income, un-earned income, total deductions, total credits, alternative minimum tax (AMT) and the like). The tax calculation engine 50 utilizes the one or more calculation graphs 14 as described previously in the context of FIGS. 1, 6A and 6B. In one embodiment, a series of different calculation graphs 14 are used for respective tax topics. These different calculation graphs 14 may be coupled together or otherwise compiled as a composite calculation graph 14 to obtain an amount of taxes due or a refund amount based on the information contained in the shared data store 42. The tax calculation engine 50 reads the most current or up to date information contained within the shared data store 42 and then performs tax calculations. Updated tax calculation values are then written back to the shared data store 42. As the updated tax calculation values are written back, new instances 46 of the canonical model 46 are created. The tax calculations performed by the tax calculation engine 50 may include the calculation of an overall tax liability or refund due. The tax calculations may also include intermediate calculations used to determine an overall tax liability or refund due (e.g., AGI calculation). Tax calculations include, for example, the ACA penalty that is described in FIG. 6B as one illustrative example.

Still referring to FIG. 7, the system 40 includes a tax logic agent 60 (also referred to as "TLA 60"). The TLA 60 operates in conjunction with the shared data store 42 whereby updated tax data represented by instances 46 are read to the TLA 60. The TLA 60 contains run time data 62 that is read from the shared data store 42. The run time data 62 represents the instantiated representation of the canonical tax schema 44 at runtime. The TLA 60 may contain therein a rule engine 64 that utilizes a fact cache to generate either non-binding suggestions 66 for additional question(s) to present to a user or "Done" instructions 68 which indicate that completeness has occurred and additional input is not needed. The rule engine 64 may operate in the form of a Drools expert engine. Other declarative rules engines 64 may be utilized and a Drools expert rule engine 64 is provided as one example of how embodiments may be implemented. The TLA 60 may be implemented as a dedicated module contained within the tax program 100.

As seen in FIG. 7, the TLA 60 uses the decision tables 30 to analyze the run time data 62 and determine whether a tax return is complete. Each decision table 30 created for each topic or sub-topic is scanned or otherwise analyzed to determine completeness for each particular topic or sub-topic. In the event that completeness has been determined with respect to each decision table 30, then the rule engine 64 outputs a "done" instruction 68 to the UI control 80. If the rule engine 64 does not output a "done" instruction 68 that means there are one or more topics or sub-topics that are not complete, in which case, as explained in more detail below, the UI control 80 presents interview questions to a user for answer. The TLA 60 identifies a decision table 30 corresponding to one of the non-complete topics or sub-topics and, using the rule engine 64, identifies one or more non-binding suggestions 66 to present to the UI control 80. The non-binding suggestions 66 may include a listing or compilation of one or more questions (e.g., $Q_1$-$Q_5$ as seen in FIG. 7) from the decision table 30. In some instances, the listing or compilation of questions may be ranked in order by rank. The ranking or listing may be weighted in order of importance, relevancy, confidence level, or the like. For example, a top ranked question may be a question that, based on the remaining rows (e.g., $R_1$-$R_5$) in a decision will most likely lead to a path to completion. As part of this ranking process, statistical information such as the STAT1, STAT2 percentages as illustrated in FIG. 5 may be used to augment or aid this ranking process. Questions may also be presented that are most likely to increase the confidence level of the calculated tax liability or refund amount. In this regard, for example, those questions that resolve data fields associated with low confidence values may, in some embodiments, be ranked higher.

The following pseudo code generally expresses how a rule engine 64 functions utilizing a fact cache based on the runtime canonical data 62 or the instantiated representation of the canonical tax schema 46 at runtime and generating non-binding suggestions 66 provided as an input a UI control 80. As described in U.S. application Ser. No. 14/097, 057 previously incorporated herein by reference, data such as required inputs can be stored to a fact cache so that the needed inputs can be recalled at a later time, and to determine what is already known about variables, factors or requirements of various rules:

Rule engine (64)/Tax Logic Agent (TLA) (60)
    //initialization process
    Load_Tax_Knowledge_Base;
    Create_Fact_Cache; While (new_data_from_application)
      Insert_data_into_fact_cache;
        collection=Execute_Tax_Rules; //collection is all the fired rules and corresponding conditions
        suggestions=Generate_suggestions (collection);
        send_to_application(suggestions);

The TLA 60 may also receive or otherwise incorporate information from a statistical/life knowledge module 70. The statistical/life knowledge module 70 contains statistical or probabilistic data related to the taxpayer. For example, statistical/life knowledge module 70 may indicate that taxpayers residing within a particular zip code are more likely to be homeowners than renters. More specifically, the statistical/life knowledge module may comprise tax correlation data regarding a plurality of tax matter correlations. Each of the tax matter correlations quantifies a correlation between a taxpayer attribute and a tax related aspect. For instance, a taxpayer attribute could be taxpayer age which may be correlated to a tax related aspect such as having dependents, or a taxpayer attribute might be taxpayer age which may be correlated to homeownership or other relevant tax related aspect. The tax correlation data also quantifies the correlations, such as by a probability of the correlation. For instance, the correlation between the taxpayer attribute and the tax related aspect may be a certain percentage probability, such as 10%, 20%, 30%, 40%, 50%, 60%, or any percentage from 0% to 100%. Alternatively, the quantification can be a binary value, such as relevant or not relevant. In other words, for a given taxpayer attribute, it may be determined that a tax related aspect is relevant or completely not relevant when a taxpayer has the given taxpayer attribute. As an example, if the taxpayer attribute is that the taxpayer is married, the correlation may indicate that spouse information is relevant and will be required.

The TLA 60 may use this knowledge to weight particular topics or questions related to these topics. For example, in the example given above, questions about home mortgage interest may be promoted or otherwise given a higher weight. The statistical knowledge may apply in other ways as well. For example, tax forms often require a taxpayer to list his or her profession. These professions may be associated with transactions that may affect tax liability. For instance, a taxpayer may list his or her occupation as "teacher." The statistic/life knowledge module 70 may contain data that shows that a large percentage of teachers have retirement accounts and in particular 403(*b*) retirement accounts. This information may then be used by the TLA 60 when generating its suggestions 66. For example, rather than asking generically about retirement accounts, the suggestion 66 can be tailored directly to a question about 403(b) retirement accounts.

The data that is contained within the statistic/life knowledge module 70 may be obtained by analyzing aggregate tax data of a large body of taxpayers. For example, entities having access to tax filings may be able to mine their own proprietary data to establish connections and links between various taxpayer characteristics and tax topics. This information may be contained in a database or other repository that is accessed by the statistic/life knowledge module 70. This information may be periodically refreshed or updated to reflect the most up-to-date relationships. Generally, the data contained in the statistic/life knowledge module 70 is not specific to a particular tax payer but is rather generalized to characteristics shared across a number of tax payers although in other embodiments, the data may be more specific to an individual taxpayer.

Still referring to FIG. 7, the UI controller 80 encompasses a user interface manager 82 and a user interface presentation or user interface 84. The user interface presentation 84 is controlled by the interface manager 82 and may manifest itself, typically, on a visual screen or display 104 that is presented on a computing device 102 (seen, for example, in FIG. 13). The computing device 102 may include the display of a computer, laptop, tablet, mobile phone (e.g., Smartphone), or the like. Different user interface presentations 84 may be invoked using a UI generator 85 depending, for example, on the type of display or screen 104 that is utilized by the computing device. For example, an interview screen with many questions or a significant amount of text may be appropriate for a computer, laptop, or tablet screen but such as presentation may be inappropriate for a mobile computing device such as a mobile phone or Smartphone. In this regard, different interface presentations 84 may be prepared for different types of computing devices 102. The nature of the interface presentation 84 may not only be tied to a particular computing device 102 but different users may be given different interface presentations 84. For example, a taxpayer that is over the age of 60 may be presented with an interview screen that has larger text or different visual cues than a younger user.

The user interface manager 82, as explained previously, receives non-binding suggestions from the TLA 60. The non-binding suggestions may include a single question or multiple questions that are suggested to be displayed to the taxpayer via the user interface presentation 84. The user interface manager 82, in one aspect of the invention, contains a suggestion resolution element 88, which is responsible for resolving how to respond to the incoming non-binding suggestions 66. For this purpose, the suggestion resolution element 88 may be programmed or configured internally. Alternatively, the suggestion resolution element 88 may access external interaction configuration files. Additional details regarding configuration files and their use may be found in U.S. patent application Ser. No. 14/206,834, which is incorporated by reference herein.

Configuration files specify whether, when and/or how non-binding suggestions are processed. For example, a configuration file may specify a particular priority or sequence of processing non-binding suggestions 66 such as now or immediate, in the current user interface presentation 84 (e.g., interview screen), in the next user interface presentation 84, in a subsequent user interface presentation 84, in a random sequence (e.g., as determined by a random number or sequence generator). As another example, this may involve classifying non-binding suggestions as being ignored. A configuration file may also specify content (e.g., text) of the user interface presentation 84 that is to be generated based at least in part upon a non-binding suggestion 66.

A user interface presentation 84 may comprise pre-programmed interview screens that can be selected and provided to the generator element 85 for providing the resulting user interface presentation 84 or content or sequence of user interface presentations 84 to the user. User interface presentations 84 may also include interview screen templates, which are blank or partially completed interview screens that can be utilized by the generation element 85 to construct a final user interface presentation 84 on the fly during runtime.

As seen in FIG. 7, the UI controller 80 interfaces with the shared data store 42 such that data that is entered by a user in response to the user interface presentation 84 can then be transferred or copied to the shared data store 42. The new or updated data is then reflected in the updated instantiated representation of the schema 44. Typically, although not exclusively, in response to a user interface presentation 84 that is generated (e.g., interview screen), a user inputs data to the tax program 100 using an input device that is associated with the computing device. For example, a taxpayer may use a mouse, finger tap, keyboard, stylus, voice entry, or the like to respond to questions. The taxpayer may also be asked not only to respond to questions but also to include dollar amounts, check or un-check boxes, select one or more options from a pull down menu, select radio buttons, or the like. Free form text entry may also be requested from the taxpayer. For example, with regard to donated goods, the taxpayer may be prompted to explain what the donated goods are and describe the same in sufficient detail to satisfy requirements set by a particular taxing authority.

Still referring to FIG. 7, in one aspect, the TLA 60 outputs a current tax result 65 which can be reflected on a display 104 of a computing device 102, 103. For example, the current tax result 65 may illustrate a tax due amount or a refund amount. The current tax results 65 may also illustrate various other intermediate calculations or operations used to calculate tax liability. For example, AGI or TI may be illustrated. Deductions (either itemized or standard) may be listed along with personal exemptions. Penalty or tax credits may also be displayed on the computing device 102, 103. This information may be displayed contemporaneously with other information, such as user input information, or user interview questions or prompts or even narrative explanations 116 as explained herein.

The TLA 60 also outputs tax data that is used to generate the actual tax return (either electronic return or paper return). The return itself can be prepared by the TLA 60 or at the direction of the TLA 60 using, for example, the services engine 90 that is configured to perform a number of tasks or services for the taxpayer. The services engine 90 is operatively coupled to the TLA 60 and is configured to perform a number of tasks or services for the taxpayer. For example, the services engine 90 can include a printing option 92. The printing option 92 may be used to print a copy of a tax return, tax return data, summaries of tax data, reports, tax forms and schedules, and the like. The services engine 90 may also electronically file 94 or e-file a tax return with a tax authority (e.g., federal or state tax authority). Whether a paper or electronic return is filed, data from the shared data store 42 required for particular tax forms, schedules, and the like is transferred over into the desired format. With respect to e-filed tax returns, the tax return may be filed using the MeF web-based system that allows electronic filing of tax returns through the Internet. Of course, other e-filing systems may also be used other than those that rely on the MeF standard. The services engine 90 may also make one or more recommendations 96 based on the run-time data 62 contained in the TLA 60. For instance, the services engine 90 may identify that a taxpayer has incurred penalties for underpayment of estimates taxes and may recommend to the taxpayer to increase his or her withholdings or estimated tax payments for the following tax year. As another example, the services engine 90 may find that a person did not contribute to a retirement plan and may recommend 96 that a taxpayer open an Individual Retirement Account (IRA) or look into contributions in an employer-sponsored retirement plan. The services engine 90 may also include a calculator 98 that can be used to calculate various intermediate calculations used as part of the overall tax calculation algorithm. For example, the calculator 98 can isolate earned income, investment income, deductions, credits, and the like. The calculator 98 can also be used to estimate tax liability based on certain changed assumptions (e.g., how would my taxes change if I was married and filed a joint return?). The calculator 98 may also be used to compare analyze differences between tax years.

By using calculation graphs 14 to drive tax calculations and tax operations, it is possible to determine interdependencies of the nodes (including tax operations, functional nodes and function nodes) and the year-over-year calculation graphs 14 can be used to readily identify differences and report the same to a user. Differences can be found using commonly used graph isomorphism algorithms over the two respective calculation graphs 14.

Figure 8:
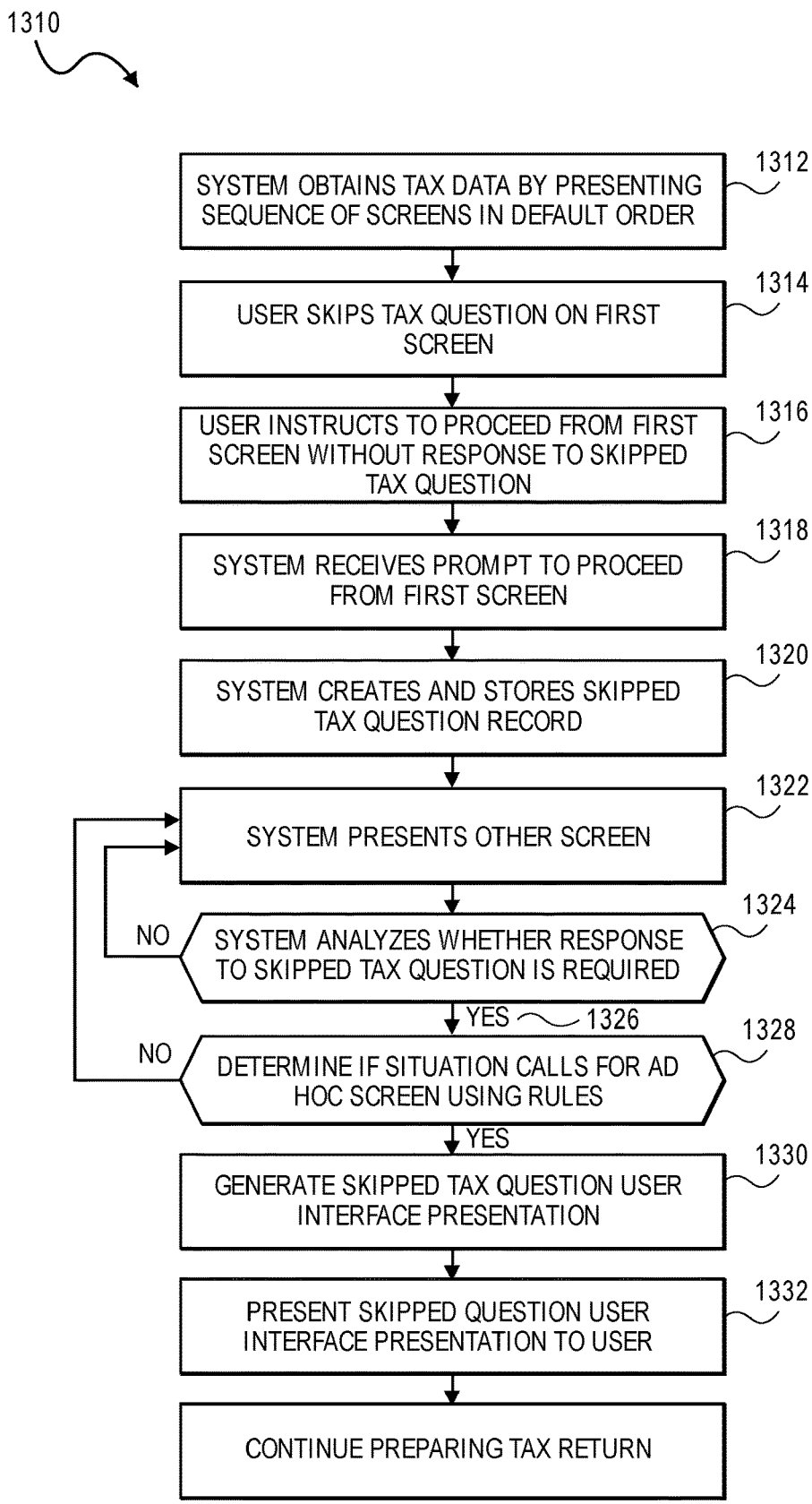
FIG. 8 schematically illustrates an example of a tax return preparation system generating and presenting a user interface presentation for a tax question tax question in an ad hoc manner, according to one embodiment.
Figure 9:
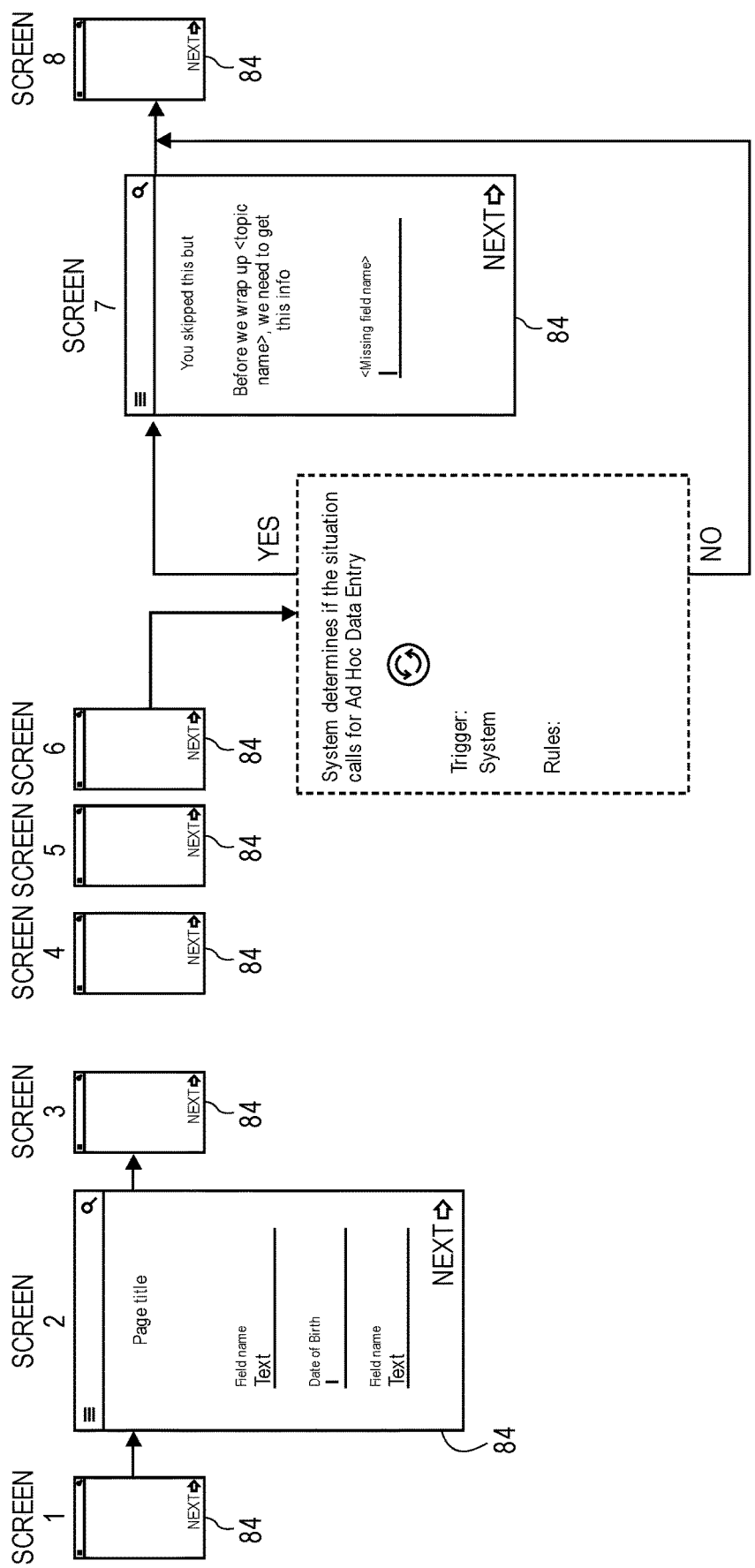
FIG. 9 illustrates a flowchart of an algorithm for generating and presenting a user interface presentation for a tax question in an ad hoc manner, according to one embodiment.

Turning to FIGS. 8 and 9, the tax system 40 is further configured to allow user interface presentations 84 user to be generated and presented to the user in an ad hoc manner. FIG. 8 illustrates a flowchart for an algorithm 1310 for using the tax system 40 to generate and present user interface presentations in an ad hoc manner, while FIG. 9 schematically illustrates an example of the tax system 40 performing the algorithm 1310. As shown in FIG. 8, at step 1312, the tax system 40 displays a sequence of user interface presentations 84 in the form of interview screens 84 in a default or base sequence, each having one or more tax questions for requesting tax data from the user. FIG. 9 shows the tax system 40 displaying interview screens 84 from "SCREEN 1" to "SCREEN 6" in a default sequence. Step 1312 may be performed by the TLA 60 and/or the user interface manager 82, as described above. At step 1314, the user does not provide a response to a tax question (referred to as "skipped tax question") on a first user interface presentation presented in the default sequence. FIG. 9 illustrates SCREEN 2 in which the tax question requesting a "date of birth" is not answered by the user. At step 1316, the user instructs the tax system 40 to proceed to form the first user interface presentation 84 without a response to the skipped tax question, such as by selecting a prompt on the first user interface presentation 84. For example, each of the user interface presentations 84 may include a "NEXT" button or other selectable prompt for advancing to the next user interface presentation 84. At step 1318, the tax system 40 receives the prompt from the user to proceed from the first user interface presentation 84, without the user having provided a response to the first tax question. Step 1318 may be performed by the user interface manager 82. As shown in FIG. 9, the user may select the "NEXT" button on SCREEN 2. At step 1320, the tax system 40 captures the skipped tax question. For example, the tax system 40 may generate and store a skipped tax question record indicating that the skipped tax question was skipped. Step 1320 may be performed by the user interface manager 82 and/or the TLA 60. For instance, the TLA 60 may generate and a skipped tax question record and/or add the skipped tax question to the completeness module 11. The TLA 60 may then utilize the skipped tax question record when analyzing missing tax data and determining suggested tax questions to provide to the user interface manager 82, as described herein. Alternatively, or in addition, the user interface manager 82 may generate and store a skipped tax question record which the user interface manager 82 utilizes when determining a tax question to present to the user.

Still referring to FIGS. 8 and 9, at step 1322, the tax system 40 proceeds with obtaining tax data by analyzing missing tax data, and presenting one or more subsequent user interface presentations including one or more other tax questions different from the skipped tax question. The process of analyzing missing tax data, and presenting user interface presentations with tax questions in step 1322 is performed by the TLA 60 and user interface manager 82, as described above. As shown in FIG. 9, SCREENS 3-6 are presented to the user after proceeding from SCREEN 2 having the skipped the tax question. During the process of determining tax questions for the subsequent user interface presentations, at step 1324, the tax system 40 analyzes whether a response to the skipped tax question is required for some reason. Step 1324 may be performed by the TLA 60 and/or the user interface manager 82. As some examples, an answer to the skipped tax questions may be needed for any suitable reason, such as one of the following reasons: (a) to proceed with a tax topic currently being worked on by the user; (b) to accurately perform a tax calculation; or (c) it is the only remaining tax data required to complete the tax return. If the tax system 40 determines that a response to the skipped tax question is not yet required, the tax system 40 simply continues repeating steps 1322 and 1324. At step 1326, the tax system 40 determines that a response to the skipped tax question is required, for example, for any of the reasons set forth herein. Steps 1324 and 1326 are illustrated in FIG. 9 by the decision box 87.

At step 1328, the tax system 40 may analyze the reason a response to the skipped tax question is required against one or more rules to determine whether the skipped tax is suitable to be asked ad hoc, i.e., suitable for including in a skipped tax question user interface presentation 84. For instance, if response to the skipped tax question is only one of multiple missing tax data items needed for the reasons, then the rule may limit the number of missing tax data items to be asked in an ad hoc manner, for instance, a limit of 2, or 3 or 4, or 5 or 6, missing tax data items. If there are too many missing tax data items, it may not make sense to attempt to ask tax questions for the missing tax data items because it will be too complicated or burdensome on the user. Again, step 1328 may be performed by the TLA 60 and/or the user interface manager 82. Step 1326 is also illustrated in FIG. 9 in the decision box 87.

At step 1330, the tax system 40 dynamically generates a skipped tax question user interface presentation 84 which includes the first tax question (it may also include other tax questions required by the reason determined at step 1322). The skipped tax question user interface presentation 84 may also include an explanation as to why the first tax question is being asked again, such as explaining that the answer to the first tax question is needed to proceed with the tax topic currently being processed. Step 1330 may be performed by the TLA 60 and/or the user interface manager 82. Step 1330 is illustrated by SCREEN 7 in FIG. 9. At step 1332, the tax system 40 presents the skipped tax question user interface presentation 84 to the user. Step 1332 is performed by the user interface manager 82. Step 1332 is illustrated in FIG. 9 by SCREEN 7. The process of preparing the tax return may then continue normally as described herein.

Referring again to FIG. 7, the system 40 includes an explanation engine 110 that operates within the tax program 100 to generate a narrative explanation from the one or more explanations associated with a particular tax operation 29 (illustrated in FIGS. 6A-6B). To generate the narrative explanation for a particular tax operation 29, the explanation engine 110 extracts the stored function 28 that is associated with the particular functional node 26. The stored function 28 is one function of a defined set and may be associated with a brief explanation. For example, a "cap" function may be associated with an explanation of "value exceeds cap." This brief explanation can be combined with a stored explanation or narrative that is associated with the particular functional node 26 within the calculation graph 14. For example, the functional node 26 paired with the stored "cap" function 28 gives a contextual tax explanation that is more than merely "value exceeds cap." For instance, a pre-stored narrative associated with the particular functional node 26 having to do with the child tax credit within the calculation graph 14 may be a complete statement or sentence such as "You cannot claim a child tax credit because your income is too high." In other embodiments, the pre-stored narrative may be only a few words or a sentence fragment. In the above example, the pre-stored narrative may be "credit subject to income phase out" or "AGI too high." A particular functional node 26 and associated function 28 may have multiple pre-stored narratives. The particular narrative(s) that is/are associated with a particular functional node 26 and associated function 28 may be stored in entries 112 in a data store or database such as data store 42 of FIG. 7. For example, with reference to FIG. 7, data store 42 contains the pre-stored narratives that may be mapped or otherwise tagged to particular functional nodes 26 and associated functions 28 contained within the calculation graph(s) 14. The locations or addresses of the various functional nodes 26 and the associated functions 28 can be obtained using the calculation graphs 14.

Figure 10A:
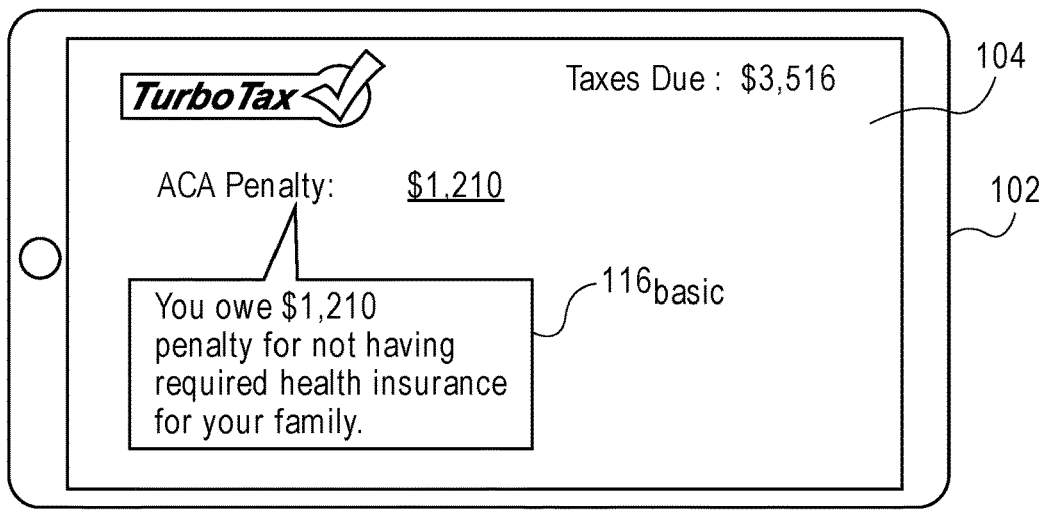
FIG. 10A illustrates a display of a computing device displaying a narrative explanation according to one embodiment.
Figure 10B:
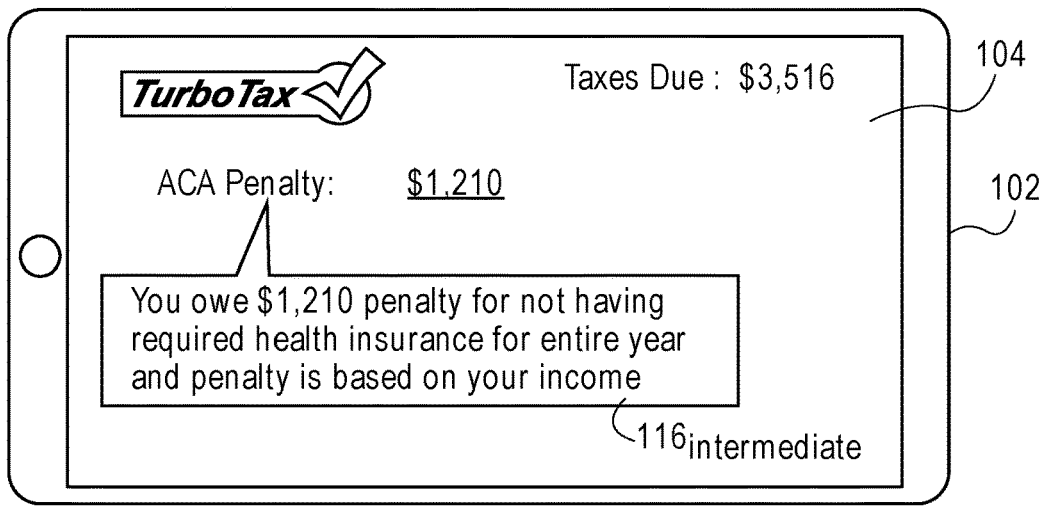
FIG. 10B illustrates a display of a computing device displaying a narrative explanation according to another embodiment.
Figure 10C:
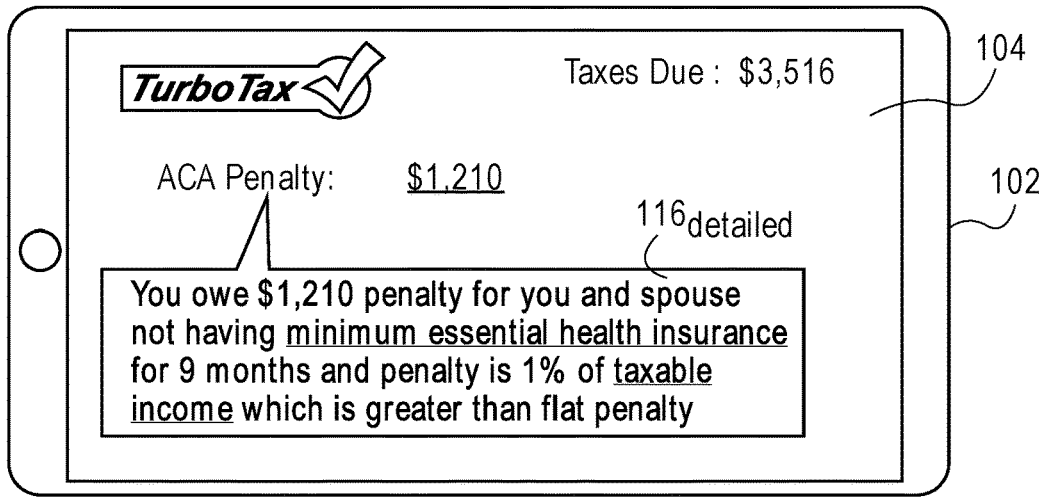
FIG. 10C illustrates a display of a computing device displaying a narrative explanation according to another embodiment.

These stored entries 112 can be recalled or extracted by the explanation engine 110 and then displayed to a user on a display 104 of a computing device 102, 103. For example, explanation engine 110 may interface with the UI control 80 in two-way communication such that a user may ask the tax program 100 why a particular tax calculation, operation, or decision has been made by the system 40. For instance, the user may be presented with an on-screen link (FIGS. 12A, 12B, 13A, 13B, 14A, and 14B illustrate a hyperlink 120), button, or the like that can be selected by the user to explain to the user why a particular tax calculation, operation, or decision was made by the tax program 100. For example, in the context of FIG. 6B described herein, a user may see an ACA penalty of $1,210.00 listed on the screen of the computing device 102, 103 while he or she is preparing the tax return for a prior year. FIGS. 10A-10C illustrate an example of such a screen shot. The taxpayer may be interested in why there is such a penalty. As one example, the initial explanation provided to the user may be "you have an ACA penalty because you, your spouse, and your two child dependents did not have coverage during the 2014 calendar year and the penalty is based on your income." This explanation may be associated with, for example, function node 26 and function 28 pair B in FIG. 6B. In some instances, a user is able to further "drill down" with additional questions to gain additional explanatory detail. This additional level of detailed explanations is possible by retracing the calculation graph(s) 14 to identify a predecessor or upstream function node 26 and function 28. In the context of the example listed above, a user may not be satisfied and may want additional explanation. In this instance, for example, the word "income" may be highlighted or linked with a hyperlink. A user clicking on this would then be provided with additional explanation on the detail regarding the ACA penalty. In this example, the user may be provided with "Under the ACA your penalty is the greater of 1% of your taxable income or a fixed dollar amount based on your family circumstances. In your situation, the 1% of taxable income exceeded the fixed dollar amount." This particular explanation may be associated with the predecessor function node 26 and function 28 pair A in FIG. 6B. Additional details may be provided by further retracing, in a backwards fashion, the calculation graph 14.

With reference to FIG. 7, the explanation engine 110 may also automatically generate explanations that are then communicated to the user interface manager 82. The automatically generated explanations may be displayed on a display associated with the computing devices 102, 103. In some embodiments, the explanations may be contemporaneously displayed alongside other tax data and/or calculations. For example, as a user inputs his or her information into the tax program 100 and calculations are automatically updated, explanations may be automatically displayed to the user. These explanations may be displayed in a side bar, window, panel, pop-up (e.g., mouse over), or the like that can be followed by the user. The explanations may also be fully or partially hidden from the user which can be selectively turned on or off as requested by the user.

In one aspect of the invention, the choice of what particular explanation will be displayed to a user may vary. For example, different explanations associated with the same function node 26 and function 28 pair may be selected by the explanation engine 110 for display to a user based on the user's experience level. A basic user may be given a general or summary explanation while a user with more sophistication may be given a more detailed explanation. A professional user such as a CPA or other tax specialist may be given even more detailed explanations. FIGS. 10A-10C illustrates three different explanations ($116_{basic}$, $116_{intermediate}$, $116_{detailed}$) that are displayed to different users that have various degrees of explanation. FIG. 10A illustrates a basic explanation $116_{basic}$. In this example, an explanation is provided by the taxpayer owes an ACA penalty of $1,210. FIG. 10B illustrates a more detailed explanation $116_{intermediate}$ of this same penalty. In the FIG. 10B example, the taxpayer is told additional reasons behind the penalty (i.e., required health insurance was not obtained for the entire tax year). In FIG. 10C, an even more detailed explanation $116_{detailed}$ is given which more closely tracks the actual function node 26 and function 28 that makes up the calculation graph 14. Note that in FIG. 10C various terms such as "minimum essential health insurance" which has a specific definition under U.S. tax code and regulations is linked so that the user can drill into even more detail. Likewise, taxable income is linked in this example, letting the user potentially drill even further into the calculation of the ACA penalty. While three such explanations 116 are illustrated in the context of FIGS. 10A-10C, additional levels of simplicity/complexity for the explanation can be used.

In some embodiments, the different levels of explanation may be tied to product types or codes. These may be associated with, for example, SKU product codes. For example, a free edition of the tax program 100 may provide few or no explanations. In a more advanced edition (e.g., "Deluxe edition"), additional explanation is provided. Still more explanation may be provided in the more advanced editions of the tax program 100 (e.g., "Premier edition"). Versions of the tax program 100 that are developed for accountants and CPAs may provide even more explanation.

In still other embodiments a user may be able to "unlock" additional or more detailed explanations by upgrading to a higher edition of tax program 100. Alternatively, a user may unlock additional or more detailed explanations in an a la carte manner for payment of an additional fee. Such a fee can be paid through the tax program 100 itself using known methods of payment.

Figure 11:
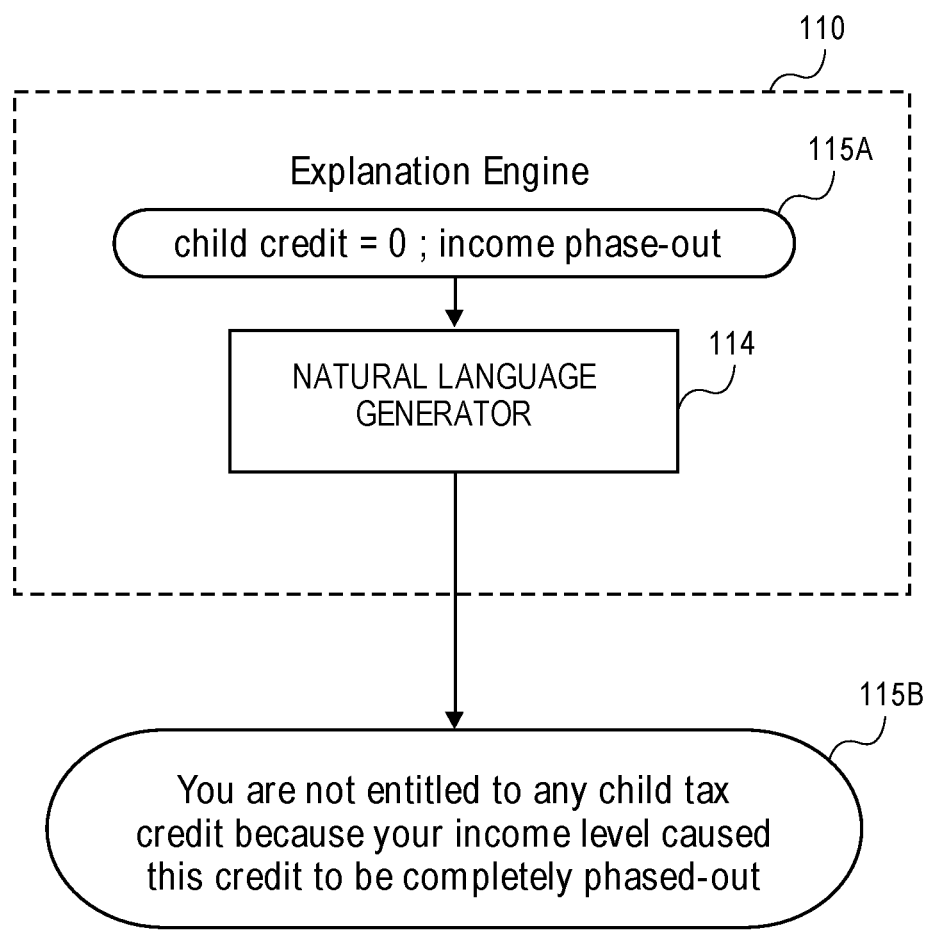
FIG. 11 illustrates an explanation engine that is part of the system of FIG. 7. The explanation engine generates narrative explanations that can be displayed or otherwise presented to users to explain one or more tax calculations or operations that are performed by the tax return preparation software.

FIG. 11 illustrates additional details of the explanation engine 110 according to an embodiment of the invention. In this embodiment, the explanation engine 110 includes a natural language generator 114 that converts fragments, expressions or partial declaratory statements into natural language expressions that are better understood by users. The natural language expressions may or may not be complete sentences but they provide additional contextual language to the more formulaic, raw explanations that may be tied directly to the explanation associated with a function node 26 and associated function 28. In the example of FIG. 11, a brief explanation 115A extracted by the explanation engine 110 which indicates that the child credit tax is zero due to phase out from income level is then subject to post-processing to convert the same into a more understandable sentence that can be presented to the user. In this example, the user is provided with a natural language explanation 115B that is more readily understood by users.

In one aspect of the invention, the natural language generator 114 may rely on artificial intelligence or machine learning such that results may be improved. For example, the explanation engine 110 may be triggered in response to a query that a user has typed into a free-form search box within the tax program 100. The search that has been input within the search box can then be processed by the explanation engine 110 to determine what tax operation the user is inquiring about and then generate an explanatory response 115B.

FIGS. 12A, 12B, 13A, 13B, 14A, and 14B illustrate various embodiments of how a narrative explanation 116 may be displayed to a user on a display 104 that is associated with a computing device 102, 103. FIGS. 10A and 10B illustrate an exemplary screen shot of a display 104 that contains a narrative explanation 116 of a tax operation. In this particular example, the tax operation pertains to the ACA shared responsibility penalty. As seen in the screen shot on display 104, the narrative explanation 116 may be presented along with additional tax data 118 that generally relates to the specific tax operation. In this example, a separate window 119 contains tax data 118 that relates to the tax operation or topic that is germane to the narrative explanation 116 that is being displayed. In this example, the taxpayer's zip code, AGI, tax exempt interest amount, exemption status, and insurance coverage status are illustrated. It should be understood, however, that the specific tax data 118 that is displayed may vary and many include more or less information. In addition, the tax data 118 may be hidden from view in other embodiments. Likewise, the tax data 118 does not have to be displayed in a separate window 119 or other area on the display 104. For example, the tax data 118 could be on a ribbon or pop-up window.

Figure 12A:
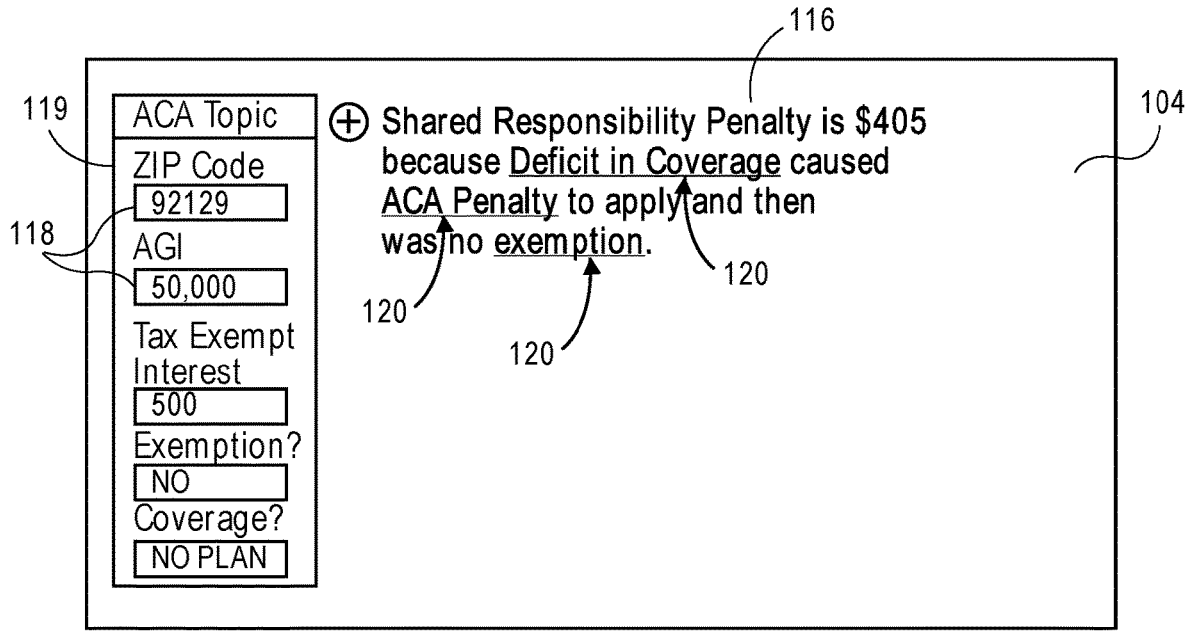
FIGS. 12A and 12B illustrate a display of a computing device displaying a narrative explanation that was generated by the explanation engine. The narrative explanation contains multiple phrases that are linked that can be selected to provide additional detailed explanations.
Figure 12B:
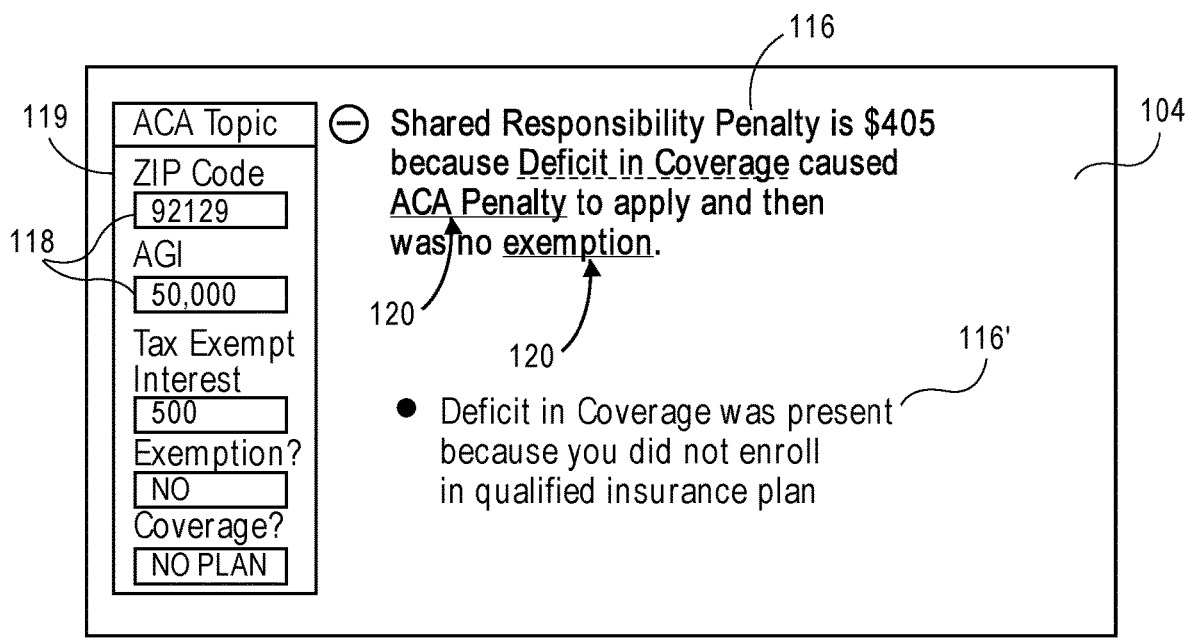

As seen in FIG. 12A, the narrative explanation 116 includes a plurality of words wherein several words or phrases are hyperlinked 120. In this regard, the narrative explanation 116 is nested as one or more phrases can be further expanded as is illustrated below. In this example, the narrative explanation 116 tells the user why the shared responsibility penalty was $405. Specifically, the narrative explanation 116 explains that the shared responsibility penalty is $405 because there was a deficit in coverage that causes the ACA penalty to apply and there was not exemption. The narrative explanation 116 in this example includes three phrases or words ("deficit in coverage"; "ACA Penalty"; "exemption") that are hyperlinked 120. A user can select a hyperlink 120 associated with one of these phrases or words where an additional narrative explanation 116' is given as illustrated in FIG. 12B. FIG. 12B illustrates a view of the display 104 after a user has selected the "deficit in coverage" phrase in FIG. 10A. As seen in FIG. 12B, the user is presented with another narrative explanation 116' explaining additional details on why there was a deficit in coverage for the taxpayer. Here, the user is told that a deficit in coverage was present because the taxpayer did not enroll in a qualified insurance plan during the year. As seen in FIG. 12B, the hyperlink 120 for "deficit in coverage" may change appearances upon being selected. For example, the hyperlink 120 may go from a solid line to a dashed line to indicate that it has been selected. Of course, other changes in appearance such as size, shape, highlighting can be used. Alternatively, the word or phrase of the hyperlink 120 may change appearances after being selected. For example, the word or phrase may change color, font size, or be highlighted to illustrate that the additional explanation 116' pertains to that specific word or phrase.

FIGS. 13A and 13B illustrate how the initial narrative explanation 116 can be expanded further a plurality of times. In this example, the initial narrative explanation 116 includes the phrase "ACA Penalty." A user may select the hyperlink 120 associated with this phrase that brings up another narrative explanation 116a that provides additional explanatory detail on the ACA penalty. In this example, the additional narrative explanation 116a itself includes several words or phrases with hyperlinks 120. In this example, "calculated ACA penalty," "minimum penalty," and "maximum penalty" are phrases that contain respective hyperlinks 120 where even additional explanation can be found. As seen in FIG. 13B, for example, a user that selects the hyperlink 120 that is associated with "calculated ACA penalty" returns another narrative explanation 116b that explains how the amount of the calculated ACA penalty was derived. In this example, the penalty was calculated as 1% of taxable income.

FIGS. 14A and 14B illustrate the same initial narrative explanation 116 as found in FIGS. 12A and 13A but with the hyperlinks 120 associated with the word "exemption" being selected. As seen in FIG. 14A, in narrative explanation 116d, the user is given an explanation that no exemption applies because the taxpayer did not qualify for any specified exemptions including the affordability exemption because the lowest cost plan, itself a defined phrase that has a hyperlink), is less than 8% of household income. FIG. 14B illustrates the same display 104 after a user has selected the hyperlink 120 that is associated with "lowest cost plan" which then displays that the lowest cost plan offered by the State in which the taxpayer resides is $250/month.

The narrative explanations 116 and their associated sub-explanations (e.g., 116', 116a, 116b, 116d, 116e) are constructed as an explanation tree with the root of the tree representing a particular tax topic or tax operation. In the example of FIGS. 12A, 12B, 13A, 13B, 14A, and 14B, the tax topic pertains to the ACA penalty. The explanation trees are readily constructed based on the function nodes 26 and associated functions 28. For example, one is able to "drill down" into more detailed explanations by traversing the directed graph that forms the calculation graph 14. For example, the initial explanation 116 that is displayed on the screen may be associated with node D of the calculation graph 14 of FIG. 6B. By selecting the ACA penalty hyperlink 120 as seen in FIGS. 13A and 13B, a predecessor node (e.g., node C) is used to generate the narrative explanation 116a. Yet another predecessor node (node A) is used to generate the narrative explanation of the calculated ACA penalty. In this manner, explanations can be presented to the user in a recursive manner by reversely traversing the calculation graph 14. Conversely, traversing progressively top-down calculation graph 14 shows how one node affects other downstream nodes.

Encapsulating the tax code and regulations within calculation graph 14 results in much improved testability and maintainability of the tax program 100. Software programming errors ("bugs") can be identified more easily when the calculation graphs 14 are used because such bugs can be traced more easily. In addition, updates to the calculation graphs 14 can be readily performed when tax code or regulations change with less effort.

Further, the degree of granularity in the narrative explanations 116 that are presented to the user can be controlled. As explained in the context of FIGS. 10A-10C, different levels of details can be presented to the user. This can be used to tailor the tax program 100 to provide scalable and personalized tax explanations to the user. In addition, the narrative explanations 116 can be quickly altered and updated as needed given that they are associated with the calculation graphs and are not hard coded throughout the underlying software code for the tax program 100.

By capturing the tax code and tax regulations in the calculation graph 14, targeted calculations can be done on various tax topics or sub-topics. For example, FIGS. 6A and 6B demonstrate a very isolated example of this where a calculation graph 14 is used to determine the amount, if any, of the ACA shared responsibility penalty. Of course, there may be many such calculation graphs 14 for the various topics or sub-topics that make up the tax code. This has the added benefit that various tax topics can be isolated and examined separately in detail and can be used to explain intermediate operations and calculations that are used to generate a final tax liability or refund amount.

Figure 15:
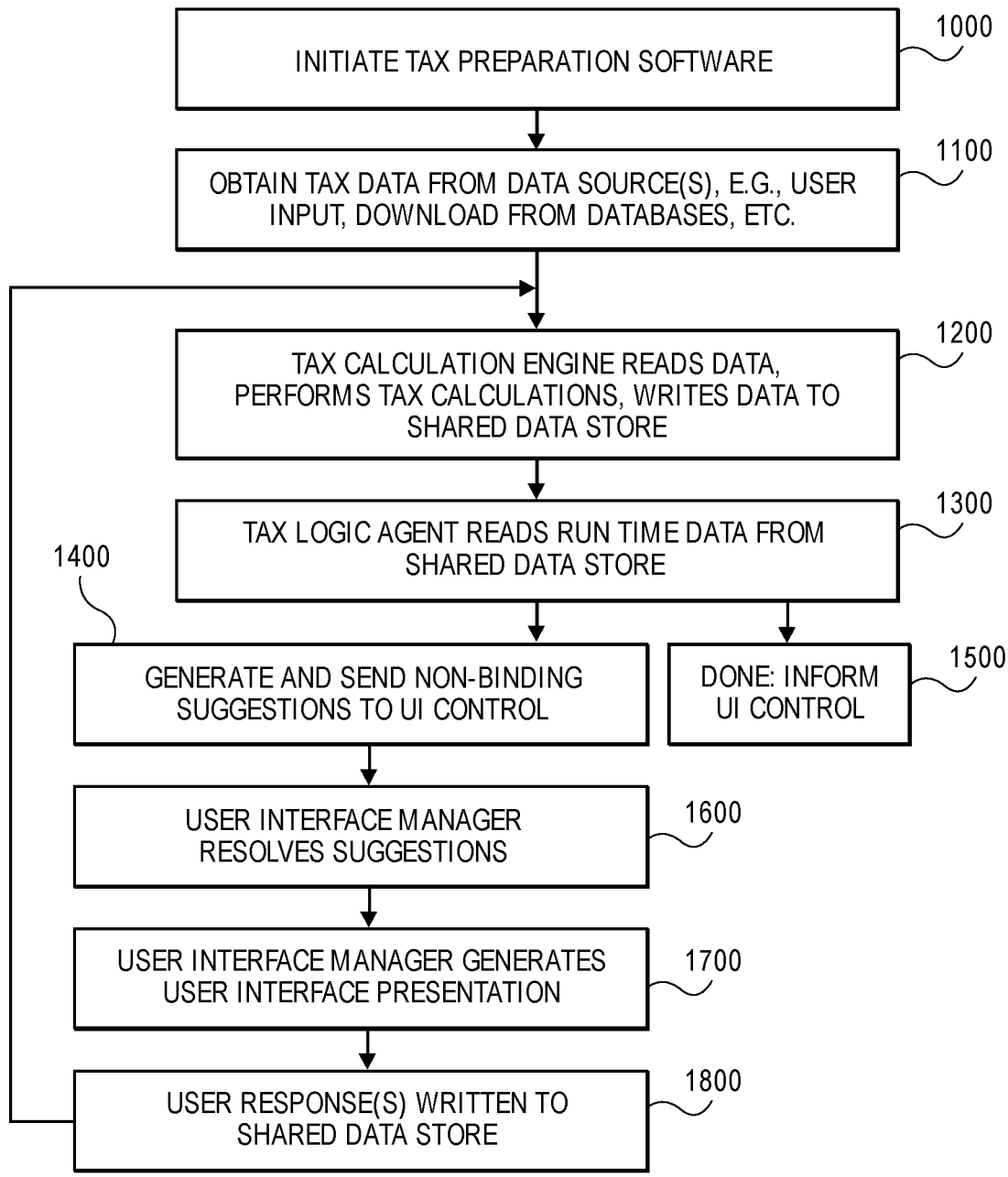
FIG. 15 illustrates a flowchart of an algorithm for the operation of the tax preparation system of FIG. 7 in preparing a tax return, according to one embodiment.

Referring now to FIG. 15, an illustrative algorithm for the operation of the tax system 40 for preparing a tax return according to an embodiment of the invention will now be described. In operation 1000, a user initiates the tax program 100 on a computing device 102 as seen, for example, in FIG. 16. The tax program 100 may reside on the actual computing device 102 that the user interfaces with or, alternatively, the tax program 100 may reside on a remote computing device 103 such as a server or the like as illustrated. In such an instances, the computing device 102 that is utilized by the user or taxpayer communicates via the remote computing device 103 using an application 105 contained on the computing device 102. The tax program 100 may also be run using conventional Internet browser software. Communication between the computing device 102 and the remote computing device 103 may occur over a wide area network such as the Internet. Communication may also occur over a private communication network (e.g., mobile phone network).

Referring back to FIG. 12, after initiating the tax program 100, the tax program 100, in operation 1100, gathers or imports tax related data from the one or more data sources 48 as illustrated in FIG. 7. Note that the gathering of tax related data from the one or more data sources 48 may occur at the time the program 100 is run. Alternatively, the gathering of tax related data from the one or more data sources 48 may occur over a period of time. For example, data sources 48 may be periodically queried over time (e.g., during a tax reporting year) whereby updated information is stored in a database (not shown) or the like that is then accessed by the tax program 100. This option may improve the efficiency and speed of tax return preparation as the information is already available.

In one embodiment, the gathering or importation of data sources such as prior tax returns 48b, online resources 48c, and third party information 48d is optional. For example, a taxpayer may want to start the process from scratch without pulling information from other sources. However, in order to streamline and more efficiently complete a tax return other users may desire to obtain tax related information automatically. This would reduce the number of interview or prompt screens that are presented to the user if such information were obtained automatically by the tax program 100. A user may be given the opportunity to select which data sources 48 they want accessed and searched for relevant tax related data that will be imported into the shared data store 42. A user may be asked to submit his or her account and password information for some data sources 48 using the UI control 80. Other data sources 48 such as some third party data sources 48d may be accessed without such information.

Next, as seen in operation 1200, after the schema 44 is populated with the various imported or entered data fields from the data sources 48, the tax calculation engine 50, using the calculation graphs 14, reads data from the shared data store 42, performs tax calculations, and writes back data to the shared data store 42. The schema 44 may also be populated with estimates or educated guesses as explained herein using the estimation module 110 as described in the context of the embodiment of FIG. 8.

In operation 1300, the tax logic agent 60 reads the run time data 62 which represents the instantiated representation of the canonical tax schema 44 at runtime. The tax logic agent 60 then utilizes the completeness module 11, such as the decision tables 30, to generate and send non-binding suggestions 66 to the UI control 80 as seen in operation 1400. Alternatively, the tax logic agent 60 may determine that completeness has been achieved across the tax topics in which case a done instruction may be delivered to the UI control as seen in operation 1500. If not done, the process continues whereby the user interface manager 82 will then process the suggestion(s) 66 using the suggestion resolution element 88 for resolving of how to respond to the incoming non-binding suggestions 66 as seen in operation 1600. The user interface manager 82 then generates a user interface presentation 84 to the user as seen in operation 1700 whereby the user is presented with one or more prompts. The prompts may include questions, affirmations, confirmations, declaratory statements, and the like. The prompts are displayed on a screen 104 of the computing device 102 whereby the user can then respond to the same by using one or more input devices associated with the computing device 102 (e.g., keyboard, mouse, finger, stylus, voice recognition, etc.).

Still referring to FIG. 12, as seen in operation 1800, the response or responses that are given by the user of the tax program 100 are then written back to the shared data store 42 to thereby update all appropriate fields of the schema 44. The process then continues with operation 1200 and proceeds as explained above until a completeness state has been reached and a done instruction is sent to the UI control 80. The repeated sequence of operations 1200-1800 may also include the method 1310, as described above, for generating and presenting tax questions in an ad hoc manner. For example, the method 1310 may be performed between steps before or after step operation 1200, or before or after operation 1300, or before or after operation 1400, in the algorithm illustrated in FIG. 15.

Figure 17:
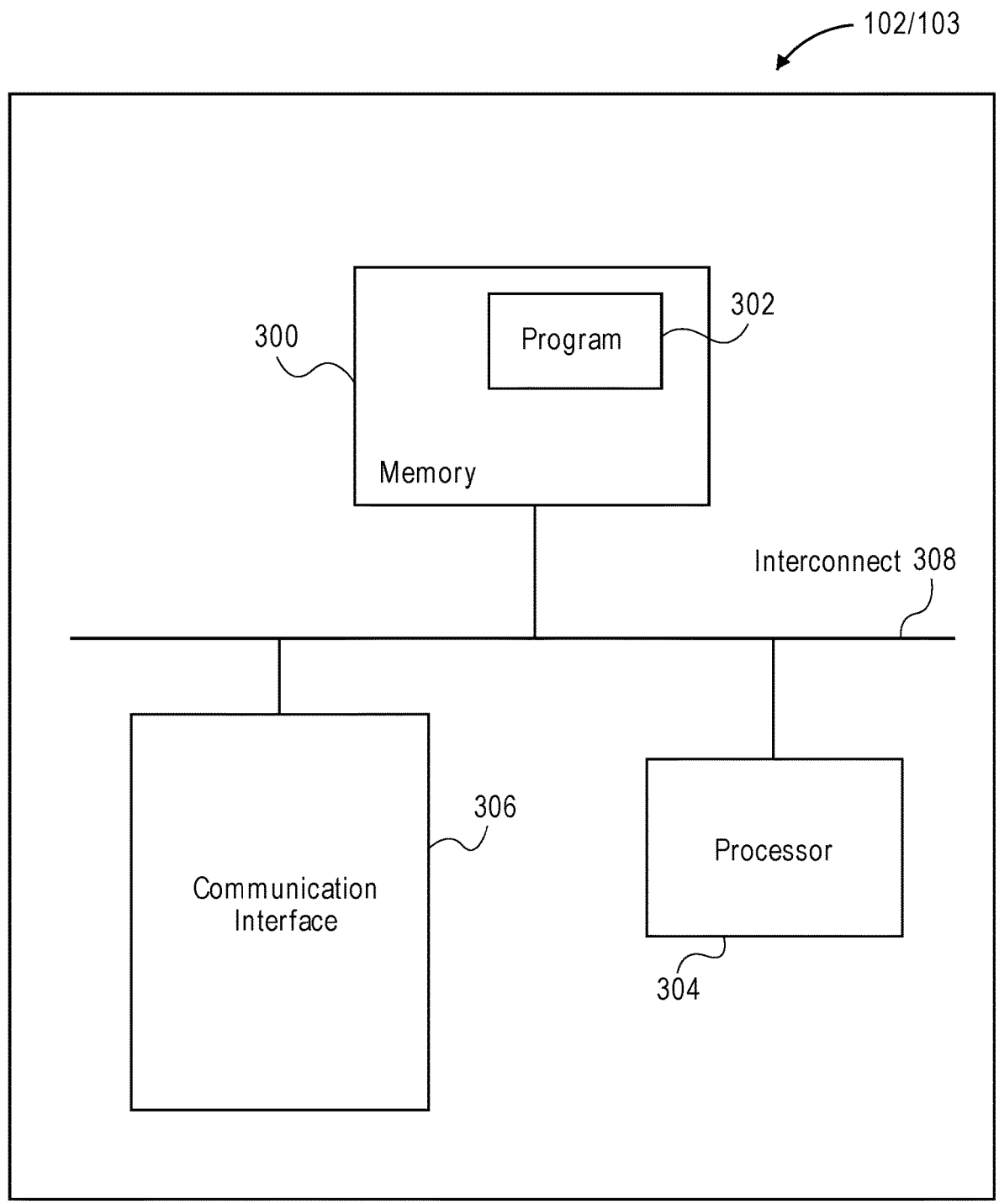
FIG. 17 illustrates generally the components of a computing device that may be utilized to execute in a tax return preparation system for preparing a tax return in which tax questions may be presented in an ad hoc manner.

FIG. 17 generally illustrates components of a computing device 102, 103 that may be utilized to execute the software for automatically calculating or determining tax liability and preparing an electronic or paper return based thereon. The components of the computing device 102 include a memory 300, program instructions 302, a processor or controller 304 to execute program instructions 302, a network or communications interface 306, e.g., for communications with a network or interconnect 308 between such components. The computing device 102, 103 may include a server, a personal computer, laptop, tablet, mobile phone, or other portable electronic device. The memory 300 may be or include one or more of cache, RAM, ROM, SRAM, DRAM, RDRAM, EEPROM and other types of volatile or non-volatile memory capable of storing data. The processor unit 304 may be or include multiple processors, a single threaded processor, a multi-threaded processor, a multi-core processor, or other type of processor capable of processing data. Depending on the particular system component (e.g., whether the component is a computer or a hand held mobile communications device), the interconnect 308 may include a system bus, LDT, PCI, ISA, or other types of buses, and the communications or network interface may, for example, be an Ethernet interface, a Frame Relay interface, or other interface. The interface 306 may be configured to enable a system component to communicate with other system components across a network which may be a wireless or various other networks. It should be noted that one or more components of the computing device 102, 103 may be located remotely and accessed via a network. Accordingly, the system configuration illustrated in FIG. 17 is provided to generally illustrate how embodiments may be configured and implemented.

Method embodiments may also be embodied in, or readable from, a computer-readable medium or carrier, e.g., one or more of the fixed and/or removable data storage data devices and/or data communications devices connected to a computer. Carriers may be, for example, magnetic storage medium, optical storage medium and magneto-optical storage medium. Examples of carriers include, but are not limited to, a floppy diskette, a memory stick or a flash drive, CD-R, CD-RW, CD-ROM, DVD-R, DVD-RW, or other carrier now known or later developed capable of storing data. The processor 304 performs steps or executes program instructions 302 within memory 300 and/or embodied on the carrier to implement method embodiments.

Embodiments, however, are not so limited and implementation of embodiments may vary depending on the platform utilized. Accordingly, embodiments are intended to exemplify alternatives, modifications, and equivalents that may fall within the scope of the claims.

What is claimed is:

1. A computer-implemented system for preparing a tax return for a taxpayer in which questions ordered in a default sequence may be presented in an ad hoc manner, comprising:

a computing device having a computer processor and memory;

a shared data store in communication with the computing device, the shared data store configured to store tax data regarding the taxpayer;

a tax return preparation software program executable by the computing device, the tax return preparation software program having a calculation engine, a tax logic agent, a user interface manager, and a completeness module which includes a completeness graph data structure and is configured to present tax questions and includes logic for determining missing tax data required to complete the tax return, the calculation engine performing one or more tax calculations based on a tax calculation graph data structure comprising a plurality of interconnected nodes including one or more of input nodes and function nodes defining data dependent calculations for calculating the tax return, the calculation engine being configured to perform a plurality of tax calculations based on the tax calculation graph using tax data read from the shared data store and update the shared data store based on the tax calculations, and the tax logic agent being configured to read data from the shared data store, evaluate missing tax data by traversing the completeness graph, and determine one or more suggested tax questions for obtaining the missing tax data;

wherein the tax return preparation software program and computing device are configured to perform a process comprising:

presenting, by the user interface manager, a first user interface presentation to a user, the first user interface presentation comprising a first tax question from the one or more suggested tax questions, the first tax question requesting from the user tax data for preparing the tax return, a first field allowing the user to enter a response to the first tax question, and a first selectable prompt allowing the user to skip the first tax question without entering a response;

receiving, by the user interface manager, a selection of the first selectable prompt from the user from the first user interface presentation indicating that the user has skipped the first tax question without entering a response to the first tax question;

generating and storing, by the user interface manager, a skipped tax question record indicating that the first tax question was skipped;

presenting, by the user interface manager, a second user interface presentation to a user comprising at least a second tax question different from the first tax question, a second field allowing the user to enter a response to the second tax question, and a second selectable prompt allowing the user to skip the second tax question without entering a response;

responsive to presenting the second user interface presentation or receiving a selection of the second selectable prompt, determining, by the tax logic agent, that a response to the first tax question is required by:

analyzing a reason the response to the first tax question is required for preparing the tax return against one or more rules that limit a number of missing tax data items needed for the reason to determine whether the first tax question that was skipped must be included in a skipped tax question user interface presentation;

in response to determining that the first tax question that was skipped must be included in the skipped tax question user interface presentation, dynamically generating, by the user interface manager, the skipped tax question user interface presentation comprising the first tax question and a third field allowing the user to enter a response to the first tax question;

presenting, by the user interface manager, the skipped tax question user interface presentation to the user; and receiving, by the user interface manager, a response to the first tax question from the skipped tax question user interface presentation.

2. The system of claim 1, wherein:

the tax logic agent is configured to evaluate missing tax data and the skipped tax question record to determine one or more suggested tax questions for obtaining missing tax data required to prepare the tax return, and provide the suggested tax questions to the user interface manager.

3. The system of claim 2, wherein the tax logic agent is configured to perform the step of determining that the response to the first tax question is required by analyzing the reason selected from a group comprising: a first reason to proceed with a tax topic currently being worked on by the user; a second reason to accurately perform a tax calculation; or a third reason that the response to the first tax question is the only remaining tax data required to complete the tax return.

4. The system of claim 1, wherein the user interface manager is configured to receive the one or more suggested tax questions, analyze the one or more suggested tax questions, determine a tax question to present to the user, and present the tax question to the user.

5. A computer-implemented method for preparing a tax return for a taxpayer in which questions ordered in a default sequence may be presented in an ad hoc manner, comprising:

a tax return preparation system executing a tax return preparation software program, the tax return preparation system comprising a computing device having a computer processor and memory, a shared data store, and a tax return preparation software program executable by the computing device; the shared data store in communication with the computing device and configured to store tax data regarding the taxpayer; the tax return preparation software program having a calculation engine, a tax logic agent, a user interface manager, and a completeness module which includes a completeness graph data structure and is configured to present tax questions and includes logic for determining missing tax data required to complete the tax return, the calculation engine performing one or more tax calculations based on a tax calculation graph data structure comprising a plurality of interconnected nodes including one or more of input nodes and function nodes defining data dependent calculations for calculating the tax return, the calculation engine being configured to perform a plurality of tax calculations based on the tax calculation graph using tax data read from the shared data store and update the shared data store based on the tax calculations, and the tax logic agent being configured to read data from the shared data store, evaluate missing tax data by traversing the completeness graph, and determine one or more suggested tax questions for obtaining the missing tax data;

presenting, by the user interface manager, a first user interface presentation to a user, the first user interface presentation comprising a first tax question from the one or more suggested tax questions, the first tax question requesting from the user tax data for preparing the tax return, a first field allowing the user to enter a response to the first tax question, and a first selectable prompt allowing the user to skip the first tax question without entering a response;

receiving, by the user interface manager, a selection of the first selectable prompt from the user indicating that the user has skipped the first tax question and wants to proceed to a second user interface presentation comprising at least a second tax question different from the first tax question; and generating and storing, by the user interface manager, a skipped tax question record indicating that the first tax question was skipped;

presenting, by the user interface manager, the second user interface presentation to the user, the second user interface presentation comprising a second field allowing the user to enter a response to the second tax question and a second selectable prompt allowing the user to skip the second tax question without entering a response;

responsive to presenting the second user interface presentation or receiving a selection of the second selectable prompt, determining, by the tax logic agent, that a response to the first tax question is required by:

analyzing, by the tax preparation system, a reason the response to the first tax question is required for preparing the tax return against one or more rules that limit a number of missing tax data items needed for the reason to determine whether the first tax question that was skipped must be included in a skipped tax question user interface presentation;

in response to determining that the first tax question that was skipped must be included in the skipped tax question user interface presentation, dynamically generating, by the user interface manager, a skipped tax question user interface presentation comprising the first tax question and a third field allowing the user to enter a response to the first tax question;

presenting, by the user interface manager, the skipped tax question user interface presentation to the user; and receiving, by the user interface manager, a response to the first tax question from the skipped tax question user interface presentation.

6. The method of claim 5, further comprising:
the tax logic agent evaluating missing tax data and the skipped tax question record to determine one or more suggested tax questions for obtaining missing tax data required to prepare the tax return; and
the tax logic agent providing the suggested tax questions to the user interface manager.

7. The method of claim 6, wherein the tax logic agent is configured to determine that the response to the first tax question is required by analyzing the reason selected from a group comprising: a first reason to proceed with a tax topic currently being worked on by the user; a second reason to accurately perform a tax calculation; or a third reason that the response to the first tax question is the only remaining tax data required to complete the tax return.

8. The method of claim 5, further comprising:
the user interface manager receiving the one or more suggested tax questions, analyzing the one or more suggested tax questions, determining a tax question to present to the user, and presenting the tax question to the user.

9. An article of manufacture comprising a non-transitory computer program carrier readable by a computer and embodying instructions executable by the computer to perform a process for preparing a tax return for a taxpayer in which questions ordered in a default sequence may be presented in an ad hoc manner using a tax return preparation system, the process comprising:

the tax return preparation system executing a tax return preparation software program, the tax return preparation system comprising a computing device having a computer processor and memory, a shared data store, and a tax return preparation software program executable by the computing device; the shared data store in communication with the computing device and configured to store tax data regarding the taxpayer; the tax return preparation software program having a calculation engine, a tax logic agent, a user interface manager, and a completeness module which includes a completeness graph data structure and is configured to present tax questions and includes logic for determining missing tax data required to complete the tax return, the calculation engine performing one or more tax calculations based on a tax calculation graph data structure comprising a plurality of interconnected nodes including one or more of input nodes and function nodes defining data dependent calculations for calculating the tax return, the calculation engine being configured to perform a plurality of tax calculations based on the tax calculation graph using tax data read from the shared data store and update the shared data store based on the tax calculations, and the tax logic agent being configured to read data from the shared data store, evaluate missing tax data by traversing the completeness graph, and determine one or more suggested tax questions for obtaining the missing tax data;

presenting, by the user interface manager, a first user interface presentation to a user, the first user interface presentation comprising a first tax question from the one or more suggested tax questions, the first tax question requesting from the user tax data for preparing the tax return, a first field allowing the user to enter a response to the first tax question, and a first selectable prompt allowing the user to skip the first tax question without entering a response;

receiving, by the user interface manager, a selection of the first selectable prompt from the user to proceed from the first user interface presentation indicating that the user has skipped the first tax question without entering a response to the first tax question;

generating and storing, by the user interface manager, a skipped tax question record indicating that the first tax question was skipped;

presenting, by the user interface manager, a second user interface presentation to the user, the second user interface presentation comprising at least a second tax question different from the first tax question, a second field allowing the user to enter a response to the second tax question, and a second selectable prompt allowing the user to skip the second tax question without entering a response;

responsive to presenting the second user interface presentation or receiving a selection of the second selectable prompt, determining, by the tax logic agent, that a response to first tax question is required by:

analyzing a reason the response to the first tax question is required for preparing the tax return against one or more rules that limit a number of missing tax data items needed for the reason to determine whether the first tax question that was skipped must be included in a skipped tax question user interface presentation;

in response to determining that the first tax question that was skipped must be included in the skipped tax question user interface presentation, dynamically generating, by the user interface manager, a skipped tax question user interface presentation comprising the first tax question and a third field allowing the user to enter a response to the first tax question;

presenting, by the user interface manager, the skipped tax question user interface presentation to the user; and receiving, by the user interface manager, a response to the first tax question from the skipped tax question user interface presentation.

10. The article of claim 9, wherein the process further comprises:

the tax logic agent evaluating missing tax data and the skipped tax question record to determine one or more suggested tax questions for obtaining missing tax data required to prepare the tax return; and the tax logic agent providing the suggested tax questions to the user interface manager.

11. The article of claim 10, wherein the tax logic agent is configured to determine that the response to the first tax question is required by analyzing the reason selected from a group comprising: a first reason to proceed with a tax topic currently being worked on by the user; a second reason to accurately perform a tax calculation; or a third reason that the response to the first tax question is the only remaining tax data required to complete the tax return.

12. The article of claim 9, wherein the process further comprises:

the user interface manager receiving the one or more suggested tax questions, analyzing the one or more suggested tax questions, determining a tax question to present to the user, and presenting the tax question to the user.

* * * * *